United States Patent
Brakob et al.

(10) Patent No.: US 12,400,206 B2
(45) Date of Patent: *Aug. 26, 2025

(54) IDENTIFYING BARCODE-TO-PRODUCT MISMATCHES USING POINT OF SALE DEVICES AND OVERHEAD CAMERAS

(71) Applicant: Target Brands, Inc., Minneapolis, MN (US)

(72) Inventors: Christopher Brakob, Minneapolis, MN (US); Ethan Sommer, Minneapolis, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 233 days.

This patent is subject to a terminal disclaimer.

(21) Appl. No.: 17/878,654

(22) Filed: Aug. 1, 2022

(65) Prior Publication Data

US 2023/0037427 A1 Feb. 9, 2023

Related U.S. Application Data

(60) Provisional application No. 63/298,692, filed on Jan. 12, 2022, provisional application No. 63/229,435, filed on Aug. 4, 2021.

(51) Int. Cl.
*G06Q 20/20* (2012.01)
*G06V 30/224* (2022.01)

(52) U.S. Cl.
CPC ....... *G06Q 20/208* (2013.01); *G06V 30/2247* (2022.01)

(58) Field of Classification Search
CPC ........ G06Q 20/208; G06V 30/22; G07G 3/00; G07G 1/00

(Continued)

(56) References Cited

U.S. PATENT DOCUMENTS 5,883,968 A   3/1999   Welch et al.
7,422,147 B2  9/2008   Rosenbaum (Continued)

FOREIGN PATENT DOCUMENTS

CN   115244560 A  * 10/2022  ........... G06K 9/2054
WO   WO-2021195523 A1 * 9/2021  ........... G06Q 20/208

*Primary Examiner* — Luna Champagne
(74) *Attorney, Agent, or Firm* — Barnes & Thornburg LLP

(57) ABSTRACT

Disclosed are systems and methods for determining whether an unknown product matches a scanned barcode during checkout. The system includes a checkout lane having a flatbed scanning area with scanning devices and a point of sale (POS) terminal that scans a product identifier of an unknown product, identifies a product associated with the scanned product identifier, and transmits, to a computing system, product information. An overhead camera idnentifies, based on detecting an optical signal from the POS terminal, that a scanning event occurred, captures image data of the unknown product, and transmits, to the computing system, the image data. The computing system generates machine learning product identification models for identifying unknown products, identifies candidate product identifications for the unknown product based on applying the models to the image data, and determines, based on the candidate product identifications and the information about the product, whether the unknown product matches the product.

18 Claims, 12 Drawing Sheets

(58) Field of Classification Search
USPC .......................................................... 705/23
See application file for complete search history.

(56) References Cited

U.S. PATENT DOCUMENTS

| | | | |
|---|---|---|---|
| 7,909,248 B1 | 3/2011 | Goncalves | |
| 8,068,674 B2 | 11/2011 | Goncalves | |
| 8,117,071 B1 * | 2/2012 | Fitch | G06Q 20/208 |
| | | | 705/16 |
| 8,336,761 B1 | 12/2012 | McCloskey | |
| 8,448,858 B1 * | 5/2013 | Kundu | G07G 3/003 |
| | | | 235/383 |
| 8,448,859 B2 | 5/2013 | Goncalves et al. | |
| 10,474,858 B2 | 11/2019 | Davis et al. | |
| 10,650,040 B2 | 5/2020 | Dube et al. | |
| 2009/0026270 A1 | 1/2009 | Connell et al. | |
| 2010/0275113 A1 * | 10/2010 | Bastos dos Santos | |
| | | | G06F 40/174 |
| | | | 715/227 |
| 2011/0129117 A1 * | 6/2011 | Ross | G06V 10/143 |
| | | | 382/103 |
| 2019/0149725 A1 * | 5/2019 | Adato | H04N 1/00 |
| | | | 348/158 |

* cited by examiner

IDENTIFYING BARCODE-TO-PRODUCT MISMATCHES USING POINT OF SALE DEVICES AND OVERHEAD CAMERAS

CROSS-REFERENCE TO RELATED APPLICATIONS

This application claims the benefit of U.S. Application Ser. No. 63/298,692, filed on Jan. 12, 2022 and U.S. Application Ser. No. 63/229,435, filed on Aug. 4, 2021. The disclosures of the prior applications are considered part of the disclosure of this application, and are incorporated in their entireties into this application.

TECHNICAL FIELD

This document generally describes devices, systems, and methods related to determining whether a product label that has been scanned matches a scanned product.

BACKGROUND

In retail environments, such as grocery stores, customers can purchase different types of products that can be priced differently. Prices can vary based on category or grouping of products. For example, fresh produce can be priced differently than frozen foods. As another example, grocery items can be priced differently than electronics or clothing.

When a customer checks out in a retail environment, such as at a self-checkout lane with a point of sale (POS) terminal, a product label, such as a barcode, can be scanned to identify a product that the customer is purchasing. The product identifier can be used to determine the product price, which can be retrieved from a database storing current prices associated with product identifiers, as well as any discounts or promotions that may apply as part of the transaction. Sometimes, the product label can be a sticker, barcode, or other type of label that can be removed from the product. In some instances, customers may attempt to remove a label from a product and replace it with a label of another, different product so that the scan registers as a different product than the product passed over the scanner. This can be known as ticket switching. Ticket switching may constitute a form of theft in that a customer may pay for a first product with a lower price even though the customer physically checks out with a second product with a higher price (when the label for the first product is placed over the label on the second product).

SUMMARY

The document generally relates to determining whether a product label that has been scanned is incorrect for a scanned product. In particular, using sensors, such as overhead cameras that are located around a checkout area having POS terminals, to capture additional information (e.g., image data) about scanned products and machine learning models, the disclosed technology can automatically and accurately determine whether a product identified based on the additional information matches a scanned product label, such as a barcode. For example, ticket switching can be difficult to detect in the moment because, conventionally, the only input at a POS terminal is the barcode scan identifying the barcode that has been read. The disclosed technology can, however, add additional signals captured by overhead cameras around the POS terminal, such as images of the physical product that is being scanned (apart from the label/barcode), which can be used to determine whether the actual product matches the barcode that is being scanned. For example, the overhead cameras can detect scanning events at POS terminals in the checkout area based on identifying a flash of light or some other optical signal from a particular POS terminal where the scanning event is occurring. By detecting the scanning event, one or more of the overhead cameras can capture image data of a scanning area (e.g., flatbed) of the particular POS terminal and transmit that image data to a computing system for further processing and analysis. Using the image data, the computing system can determine whether the scanned barcode matches the product that is captured in the image data. As a result, the computing system can identify ticket switching incidents.

An initial training phase can be used to generate models for products and their associated barcodes using features identified from images of those products as they were scanned. When a barcode is scanned, for example, a model for the product associated with the barcode can be retrieved, features of the physical product can be identified from images of the physical product as it was scanned, and a determination can be made as to whether the physical product matches the product associated with the barcode, based on the model and the features of the physical product. Such a determination may simply determine whether, or a degree to which, the physical product matches the product associated with the scanned barcode (e.g., whether ticket switching has taken place), and/or it may positively identify the physical product based on the detected features and used that positive identification to determine whether there is a match (e.g., product code for positively identified product matches the product code for the scanned barcode). Other determinations are also possible.

The computing system can determine whether an imaged product is likely the same as a product that the POS terminal identifies from a scanned barcode using machine learning models. The computing system can also positively identify the imaged product in some implementations when the computing system determines that the imaged product does not match the scanned barcode. Thus, the disclosed technology can be used to resolve situations in which a customer places a barcode from one product onto another product (e.g., ticket switching). For example, the computing system can use an n-dimensional space classification model to determine likelihood of what the imaged product may be. As another example, the computing system can use one or more product identification models to determine likelihood of what the imaged product may be. Using output from the applied model(s), the computing system can determine whether the imaged product matches the scanned barcode. If the computing system identifies a mismatch between the imaged product and the scanned barcode, the computing system can identify what the product most likely is. Identification results can also be outputted. For example, the identification results can be transmitted, by the computing system, to asset protection (AP) such that AP can respond to a potential identified ticket switching incident. The computing system can be a remote computing system, a cloud service, an edge computing device, and/or any combination thereof.

The overhead cameras can be preconfigured in the checkout area of a store. The checkout area can include multiple overhead cameras. One overhead camera can be trained on one POS terminal and associated checkout lane. One overhead camera can also be trained on multiple POS terminals and associated checkout lanes. The overhead cameras can be part of an existing security system. The overhead cameras can also be low resolution cameras. Configurations of the overhead cameras can be the same across different stores. As a result, each camera can capture images of a flatbed scanning area of the POS terminals through a consistent field of view (FOV). The consistent FOV can make it easier and more accurate for the computing system to train machine learning models to identify products using image data. Different configurations of the overhead cameras across the different stores is also possible.

Each checkout lane in the checkout area can also include a POS terminal, scanning devices, and one or more additional cameras. A customer can scan a product label, such as a barcode, using the scanning devices. The POS terminal can identify a product associated with the scanned barcode and can transmit that identification to the computing system as described herein. The one or more additional cameras can also be used to capture image data of the product, which can be used by the computing system to determine whether the scanned barcode matches the product that is being scanned.

Moreover, the overhead cameras and/or the additional cameras at the checkout lane can be used to monitor the customer as they proceed through the checkout process. Image data captured by such cameras can be used to identify the customer once the computing system determines that an imaged product does not match a scanned barcode. AP can therefore use this image data to positively and objectively identify and stop the customer who is caught ticket switching.

One or more embodiments described herein include a system for determining whether an unknown product matches a scanned barcode during a checkout process, the system including a checkout lane having a flatbed scanning area that receives one or more products to be purchased by a user, the flatbed scanning area including one or more scanning devices, and a point of sale (POS) terminal. The POS terminal can scan, using one or more of the scanning devices, a product identifier of an unknown product as the unknown product is moved over the flatbed scanning area, identify, based on the scanned product identifier, a product associated with the scanned product identifier; and transmit, to a computing system, information about the product associated with the scanned product identifier. The system also includes an overhead camera having a field of view that includes the flatbed scanning area. The overhead camera can identify, based on detecting an optical signal from the POS terminal, that a scanning event has occurred at the checkout lane, capture image data of the unknown product as it is moved over the flatbed scanning area, and transmit, to the computing system, the image data of the unknown product. The system also includes a computing system that can (i) generate one or more machine learning product identification models for identifying unknown products from image training data and (ii) determine, during runtime, whether the unknown product matches the product associated with the scanned product identifier. More particularly, the computing system can retrieve, from a data store, one or more of the product identification models, identify a plurality of candidate product identifications for the unknown product based on applying the one or more product identification models to the image data, and determine, based on the plurality of candidate product identifications and the information about the product associated with the scanned product identifier, whether the unknown product matches the product associated with the scanned product identifier.

The system can optionally include one or more of the following features. For example, the computing system can transmit a notification to the POS terminal to complete a transaction during the checkout process based on determining that the unknown product matches the product associated with the scanned product identifier. As another example, the computing device can transmit a notification to a user device of an in-store employee that the checkout process likely involves ticket switching based on determining that the unknown product does not match the product associated with the scanned product identifier. As yet another example, the product identifier can be a barcode, QR code, SKU, label, or sticker. The overhead camera can have a field of view that includes flatbed scanning areas of multiple checkout lanes. The optical signal detected from the POS terminal can be at least one of a flash of light, an infrared signal, a red light, and a change in display on a display screen of the POS terminal.

In some implementations, the image training data can include images of a plurality of known products taken from a plurality of overhead cameras at a plurality of checkout lanes. The plurality of overhead cameras can have at least one of a same (i) vantage point of the known products, (ii) field of view, and (iii) lighting.

The POS terminal can also identify the product associated with the scanned product identifier at a first time and the computing system can identify the plurality of candidate product identifications at a second time. The first time can be the same as the second time. The first time can be earlier than the second time. The first time can also be later than the second time in some implementations.

In some implementations, the product identification models can include a product classification model, and the computing system can receive image training data of a plurality of known products, train, using the image training data, the product classification model to identify features of each of the plurality of known products, map, based on the identified features, the image training data into n-dimensional space, identify clusters in the n-dimensional space, determine, based on the identified clusters, n-dimensional space values for each of the known products, and output the product classification model and the n-dimensional space values for each of the known products. Each dimension in the n-dimensional space can represent one of the identified features and each of the clusters can represent one or more known products having one or more of the identified features.

Moreover, in some implementations, determining the n-dimensional space values for each of the known products can include identifying, for each of the clusters, a centroid, determining, for each of the clusters, distances between each nearest neighbor and the centroid, and determining an aggregate n-dimensional space value for the known product based on averaging the distances between each nearest neighbor and the centroid for each of the clusters.

As another example, the product identification models can include a plurality of product-based identification models, and the computing system can receive image training data of a plurality of known products, select a first subset of the image training data that identifies a particular known product and a second subset of the image training data that identifies other known products that do not include the particular known product, train an identification model for the particular known product to identify the particular known product, and output the identification model for the particular known product. Moreover, in some implementations, the computing system can generate a product-based identification model for each of the known products identified in the image training data.

In some implementations, the computing system can rank the plurality of candidate product identifications from highest to lowest confidence value. The confidence values can be assigned based on applying the one or more product identification models to the image data and indicate a likelihood that the unknown product is one of the plurality of candidate product identifications. The computing system can also identify that the unknown product matches the product associated with the scanned product identifier based on determining that a highest ranked candidate product identification matches the product associated with the scanned product identifier.

As another example, the computing system can rank the plurality of candidate product identifications from highest to lowest confidence value. The confidence values can be assigned based on applying the one or more product identification models to the image data and can indicate a likelihood that the unknown product is one of the plurality of candidate product identifications. The computing system can also identify that the unknown product does not match the product associated with the scanned product identifier based on determining that none of the ranked candidate product identifications match the product associated with the scanned product identifier.

One or more embodiments described herein can include a computing system for determining whether an unknown product matches a scanned barcode in n-dimensional space. The computing system can generate, before runtime, a product classification model for identifying unknown products from image data based on receiving, from overhead cameras positioned at a plurality of checkout lanes in a plurality of stores, image training data for a plurality of known products, training, using the image training data, the product classification model to map visual features of the known products into multi-dimensional feature space, and determining feature space values for each of the plurality of known products based on applying the product classification model to the image training data. The computing system can also determine, during runtime, whether an unknown product matches a product associated with a scanned product identifier based on receiving, from a POS terminal at a checkout lane in a store, information for the product associated with the scanned product identifier when the unknown product is scanned by a user during a checkout process, receiving, from an overhead camera at the checkout lane, image data of the unknown product that is scanned by the user, generating a multi-dimensional space value for the unknown product based on applying the product classification model to the image data, identifying one or more candidate product identifications for the unknown product based on comparing the multi-dimensional space value for the unknown product with the feature space values for each of the plurality of known products; and determining whether any of the one or more candidate product identifications match the product associated with the scanned product identifier.

The system can optionally include one or more of the following features. For example, the computing system can rank the one or more candidate product identifications from highest to lowest multi-dimensional space value and output the one or more candidate product identifications that are ranked within a threshold range.

As another example, the computing system can identify that the unknown product matches the product associated with the scanned product identifier based on determining that any of the outputted candidate product identifications match the product associated with the scanned product identifier.

In some implementations, the computing system can identify that the unknown product does not match the product associated with the scanned product based on determining that none of the outputted candidate product identifications match the product associated with the scanned product identifier. In yet some implementations, the computing system can identify the unknown product as a top ranked candidate product identification amongst the outputted candidate product identifications.

One or more embodiments described herein can include a computing system for determining whether an unknown product matches a scanned barcode using product-based identification models. The computing system can generate, before runtime, product-based identification models for each known product based on receiving annotated image training data for a plurality of known products and training, using the image training data, product-based identification models for each of the plurality of known products. The computing system can determine, during runtime, whether an unknown product matches a product associated with a scanned product identifier based on receiving, from a POS terminal at a checkout lane in a store, information for the product associated with the scanned product identifier when the unknown product is scanned by a user during a checkout process, receiving, from an overhead camera at the checkout lane, image data of the unknown product that is scanned by the user, determining, based on applying the one or more product-based identification models to the image data, confidence values that the unknown product is one or more of the plurality of known products identified by the one or more product-based identification models, identifying one or more candidate product identifications for the unknown product based on a comparison of each of the confidence values for the unknown product, and determining whether any of the one or more candidate product identifications match the product associated with the scanned product identifier.

The system can optionally include one or more of the following features. Identifying the one or more candidate product identifications can include ranking the confidence values for the unknown product from highest to lowest confidence value. As another example, the computing system can identify that the unknown product matches the product associated with the scanned product identifier based on determining that a highest ranked candidate product identification matches the product associated with the scanned product identifier. As yet another example, the computing system can identify that the unknown product does not the product associated with the scanned product identifier based on determining that a highest ranked candidate product identification does not match the product associated with the scanned product identifier. Moreover, the computing system can identify the unknown product as a highest ranked candidate product identification.

The devices, system, and techniques described herein may provide one or more of the following advantages. For example, the disclosed technology can be used to detect whether a customer engaged in ticket switching in a retail environment, such as a store. Using the techniques described herein, the disclosed technology can determine whether a product that the customer is purchasing actually matches the product label that was scanned. Such a determination can be made quickly using machine learning models that have been trained with robust training datasets, thereby improving accuracy in product identification and matching determinations. If a determination is made that the product does not match the scanned label, then AP can be notified of this ticket switching incident. AP can respond accordingly, whether it be apprehending the customer before the customer leaves the store and/or monitoring the customer when they return to the store in the future. As a result of the disclosed technology, ticket switching incidents can be identified and appropriate action can be taken to resolve or otherwise stop ticket switching from occurring.

As another example, the disclosed technology can be used to determine what the imaged product most likely is when the imaged product does not match the scanned label. One or more machine learning models described herein can be used to determine probabilities of what the imaged product actually is. When a determination is made that the imaged product does not match the scanned label, the disclosed technology can be used to determine a most likely identification of the imaged product. For example, the machine learning models can output confidence values indicating how likely the imaged product is to be one of one or more different products. The confidence values can be sorted to determine which of the different products has a highest confidence value. The disclosed technology can then determine that the imaged product is most likely the product with the highest confidence value. This information can be useful to determine a gravity of the customer's ticket switching. For example, this information can be used to determine whether the customer is paying a price that is significantly less than the actual price of the product that is being purchased.

The gravity of the customer's ticket switching can cause AP to respond in a particular way. For example, AP may apprehend a customer who engages in a serious ticket switching (e.g., the customer purchases a set of headphones but put a gum label on the headphones, thereby paying a price of the gum instead of an actual price of the headphones) but may monitor a customer over time who engages in a less serious ticket switching (e.g., the customer purchases a bag of chips but puts a discounted candy label on the bag of chips, thereby paying the discounted price of the candy instead of the actual price of the bag of chips). This information can also be used by the POS terminal to update the customer's bill to reflect the actual price of the product that is being purchased, rather than the price that is associated with the scanned label. The disclosed techniques can therefore deter customers from ticket switching and can assist AP in monitoring ticket switching incidents.

Moreover, the disclosed technology can be used to build accurate machine learning models from robust training datasets. Image data can be collected from a plurality of cameras in checkout areas of one or more stores. The image data can be used by a computing system to train one or more machine learning models to identify imaged products. Product identification and matching determinations that are made using the machine learning models can also be used by the computing system to continuously improve such machine learning models. As a result, the machine learning models can more accurately identify products from a variety of image data.

Similarly, the disclosed technology can provide for improved data capture, which can be beneficial to train the machine learning models. Overhead cameras can be similarly configured and positioned in checkout areas across different stores. Thus, the cameras can capture consistent images and maintain uniform fields of view (FOV). The images captured by the overhead cameras may also have uniform lighting and angles that can make training machine learning models both easier and more accurate. The captured images can therefore be used to robust and uniform training datasets of imaged products. These training datasets can then be used by the computing system to train the machine learning models to more accurately identify products from image data.

As another example, the disclosed technology can be integrated with existing overhead cameras in stores. Overhead cameras that may be installed in a store for security purposes (e.g., as part of an in-store security system) can be configured to detect scanning events at POS terminals and capture image data of scanning areas at the POS terminals where the scanning events are detected. This image data can then be used by the computing system to determine whether ticket switching has occurred. As a result, new or additional cameras are not required to be installed in the checkout areas of the stores, which can make implementation of the disclosed technology easy and inexpensive. Furthermore, since the overhead cameras may be of low resolution, the machine learning models that are used for product identification and matching can be trained using low resolution images from the overhead cameras. Therefore, the machine learning models can more accurately detect and identify products from low resolution images.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document relates to determining whether a product label that has been scanned is incorrect for a scanned product. The disclosed technology can be used to identify situations when a customer engages in ticket switching (e.g., replacing a barcode of one product with a barcode of another product). The disclosed technology can also be used to identify what product the customer is likely purchasing when a determination is made that the product being purchased does not match the scanned product label. One or more machine learning models can be used to identify products that are being purchased. For example, a classification model can be used, in which image data of a scanned product is mapped into n-dimensional space. Vector values for features in the image data can be determined and analyzed in comparison to known vector values of features for a variety of different products. The disclosed technology can therefore determine a likelihood that the scanned product is one of the variety of different products. As another example, one or more product identification models can be applied to the image data of the scanned product. Each of the product identification models can be trained to identify a different product. Using the techniques described herein, the disclosed technology can also provide for ways to prevent ticket switching from occurring and/or to apprehend or otherwise monitor customers who engage in ticket switching.

Figure 1:
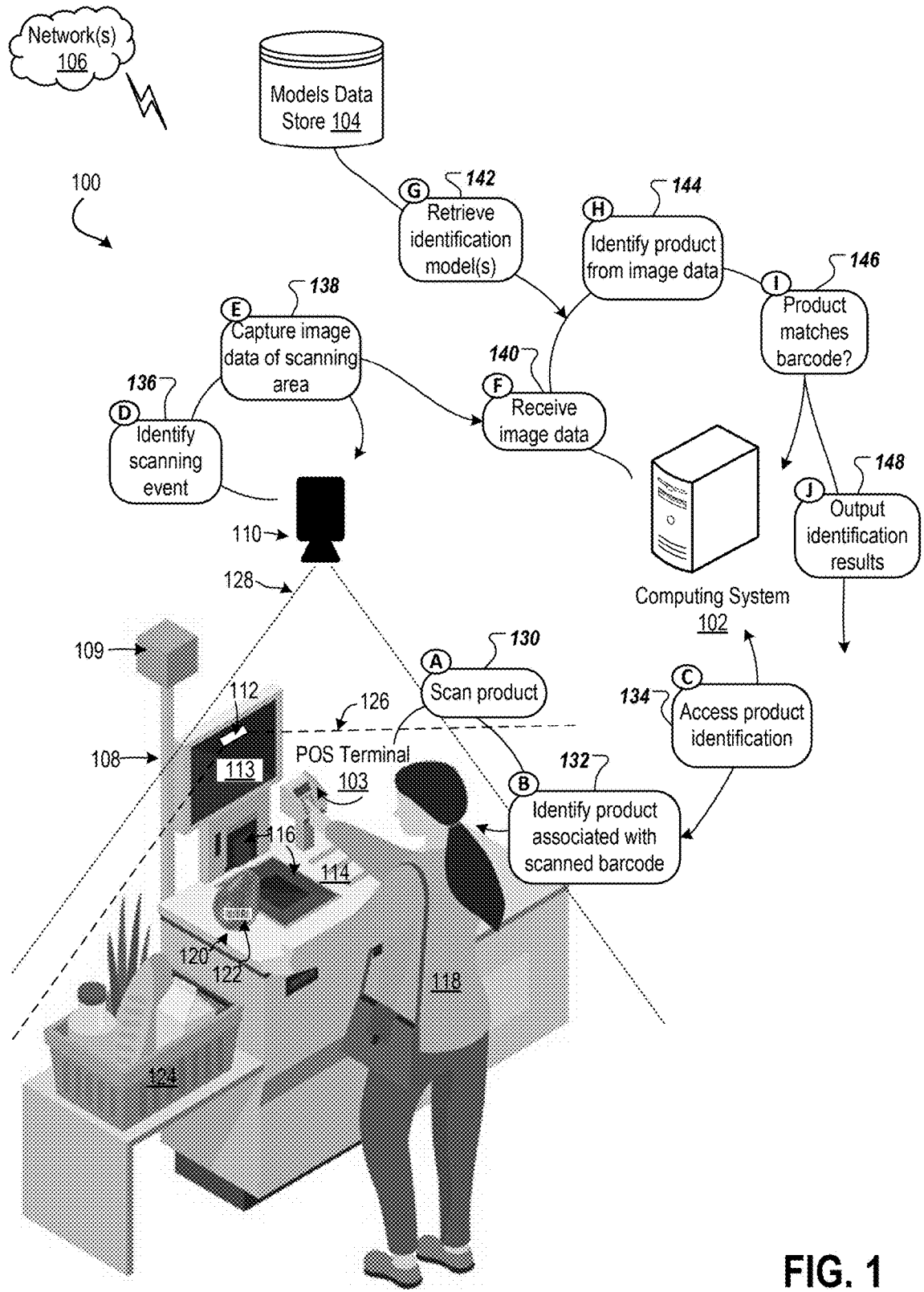
FIG. 1 is a conceptual diagram of a checkout process using the techniques described herein.

Referring to the figures, FIG. 1 is a conceptual diagram of a checkout process using the techniques described herein. A checkout lane 100 can include a flatbed 114, one or more scanning devices 116, a POS terminal 103, a light pole 108, and an overhead camera 110. A retail environment, such as a grocery store, can include multiple checkout lanes 100 that customers, such as customer 118, can use to go through a self-checkout process. The POS terminal 103, the scanning devices 116, and the overhead camera 110 can communicate (e.g., wired and/or wirelessly) via network(s) 106 with a computing system 102.

The computing system 102 can be configured to determine whether a scanned product label matches a product that is being purchased, as described further below. The computing system 102 can be remote from components of the checkout lane 100. The computing system 102 can be in communication with components (e.g., POS terminals 103) at multiple checkout lanes 100 in one store and/or across multiple different stores. The computing system can also be a cloud service, an edge computing device, and/or any combination thereof.

Referring to the checkout lane 100, the one or more scanning devices 116 can be integrated into the flatbed 114. For example, the flatbed 114 can include one or more cameras or other imaging devices. In such scenarios, the cameras or other imaging devices can be configured to capture images of products as the customer 118 scans such products. These images can be used by the computing system 102, as described further below, to identify products that are being purchased by the customer 118. Such images can also be used to train and/or improve one or more machine learning models that are used to identify the products. Moreover, the flatbed 114 can include an integrated scale that can be used to weigh products as they are placed on the flatbed 114.

The one or more scanning devices 116 can be barcode, SKU, or other label identifying devices. The scanning devices 116 can also be LiDAR, infrared, and one or more other types of scanning devices and/or flatbed scanners. For example, the one or more scanning devices 116 can include a handheld scanner that the customer 118 can direct towards a label, such as a barcode, attached to a product that the customer 118 is purchasing. The handheld scanner can also include a camera that captures images of the product as it is being scanned by the customer 118. Images captured by the handheld scanner can be used by the computing system 102 to identify the product that the customer 118 is purchasing.

The POS terminal 103 can be configured to identify products that are scanned using the one or more scanning devices 116. For example, the POS terminal 103 can receive a scan of a product label from the one or more scanning devices 116. Using the scan of the product label, the POS terminal 103 can determine a price of the product associated with the label. The POS terminal 103 can add the determined price to the customer 118's bill (e.g., transaction, receipt).

Purchase information, such as the customer 118's bill, products that have been scanned, and prices for the scanned products, can be displayed on a display screen 113 at the checkout lane 100. The display screen 113 can therefore output information about the customer 118's transaction. As the customer 118 scans products, prices associated with the products can be outputted in real-time on the display screen 113. The display screen 113 can also provide look-up and search functionality to the customer 118. For example, if the customer 118 is purchasing fresh produce, the customer 118 can input search parameters at the display screen 113 and select a search result and quantity of the selected search result to add to the customer 118's transaction. The display screen 113 can be a touchscreen. When the customer 118 is done scanning products, the customer 118 can complete their purchase by paying at the POS terminal 103.

Sometimes, the POS terminal 103 can be integrated with the display screen 113. The POS terminal 103 can also be in communication with the display screen 113 via the network(s) 106. The display screen 113 can also include an integrated camera 112. Images captured by the camera 112 can be used to positively and objectively identify the customer 118, especially in scenarios where the computing system 102 determines that the customer 118 engaged in ticket switching. For example, facial recognition techniques can be used to identify the customer 118 from the images captured by the camera 112. AP can then use the facial recognition information to objectively identify the customer 118 before the customer 118 leaves the store and/or when the customer 118 returns to the store. Images captured by the integrated camera 112 can also be used to identify characteristics of the customer 118 that can be used to objectively identify the customer 118, such as body movements, behavior, and/or appearance. The integrated camera 112 can also have a wide FOV 126 such that the camera 112 can capture a view of a surrounding area to provide more context in subsequent image analysis.

The light pole 108 can include a light 109. The light 109 can illuminate the flatbed 114, thereby providing uniform lighting. The uniform lighting can be beneficial for the overhead camera 110 to capture consistent images of products that are scanned by the customer 118 at the checkout lane 100. With consistent lighting, features of a product can be more clearly differentiated from an ambient environment in the image data. During training of the machine learning models, these features can be labeled and confidence of such labeling can increase since the image data can be associated with a timestamp of a correct barcode scan at the POS terminal 103.

Sometimes, the light pole 108 can also include a camera that faces down over the flatbed 114. The camera can be a high resolution camera and can be configured to capture images of products as they are scanned by the scanning devices 116 or otherwise passed over the flatbed 114. These images can be used by the computing system 102 to identify a product that the customer 118 is purchasing. These images can also be used to build a robust training dataset for training and improving one or more machine learning models used for product matching and identification.

The overhead camera 110 can be positioned over or proximate to the checkout lane 100. For example, the overhead camera 110 can be attached to a ceiling in the store Therefore, the overhead camera 110 can have a FOV 128, which encompasses the particular checkout lane 100. The overhead camera 110 can face down to get a top down view of the checkout lane 100. The overhead camera 110 can also be positioned or oriented at an angle to capture more than just the checkout lane 100. For example, the overhead camera 110 can be angled such that the FOV 128 includes an area surrounding the checkout lane 100 where the user may place a shopping cart, basket, or products to be purchased. Having the surrounding area in the FOV 128 can provide more context around a checkout process at the checkout lane 100.

Figure 2:
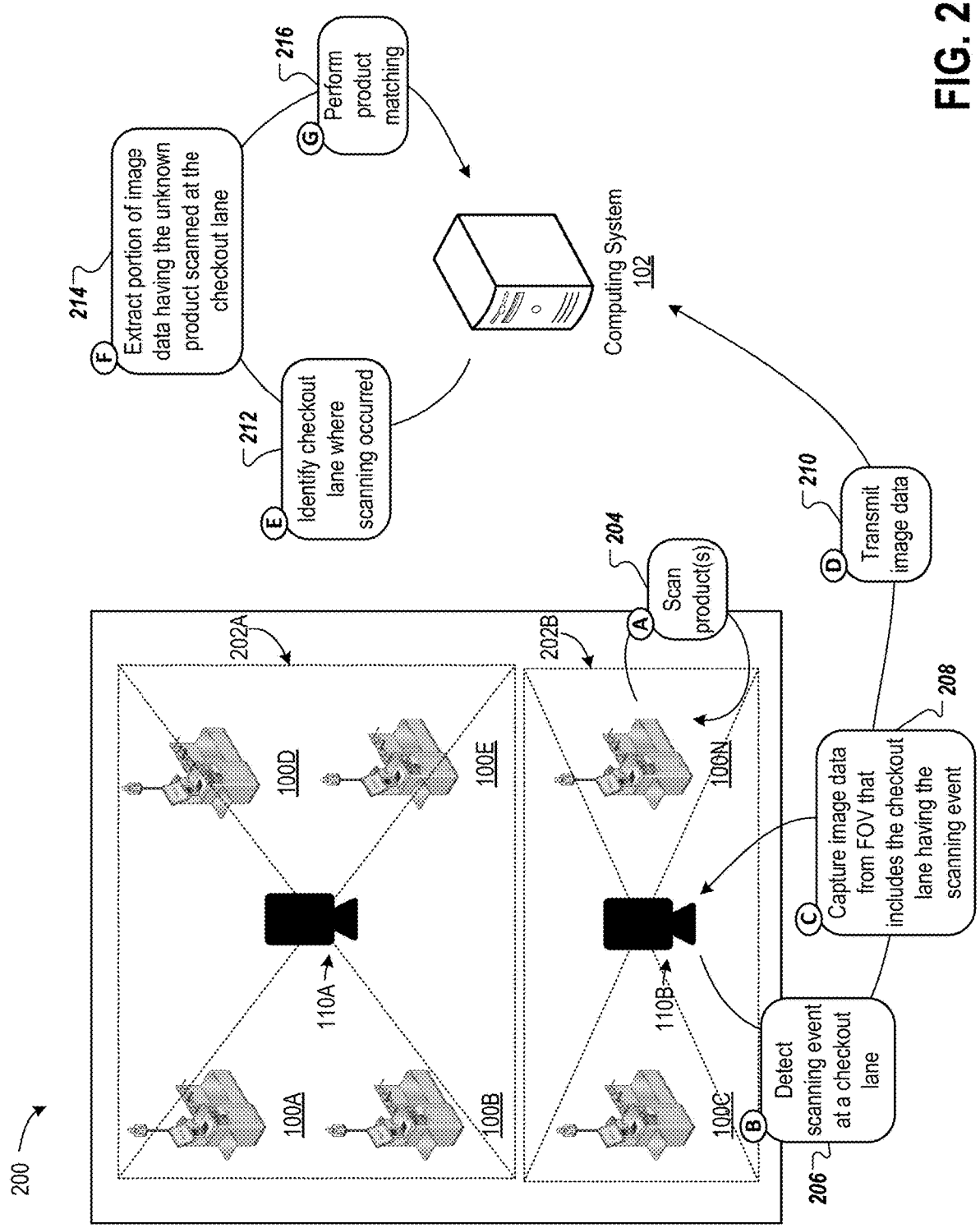
FIG. 2 is a conceptual diagram of a checkout area having multiple overhead cameras.

Sometimes, as depicted in FIG. 2, multiple overhead cameras 110 can be positioned in a checkout area. One overhead camera 110 can then be trained on multiple checkout lanes 100, thereby having a different FOV. The overhead camera 110 can be part of an existing security system in the store. As a result, additional cameras may not need to be installed in the checkout area of the store to perform the techniques described herein. The overhead camera 110 can be a low resolution camera. The overhead camera 110 can continuously capture image data of the checkout lane 100. Sometimes, the overhead camera 110 can capture image data of the checkout lane 100 upon detecting a scanning event at the checkout lane 100. The image data captured by the overhead camera 110 can be still images and/or video feeds. The low resolution image data can be used to build training datasets for training and improving the machine learning models described herein. Regardless of a configuration or arrangement of the overhead cameras 110 across different stores, the low resolution image data can be beneficial to improve accuracy of detection and identification of products using the machine learning models.

To begin the checkout process at the checkout lane 100, the customer 118 can place a shopping basket 124 or shopping cart next to the checkout lane 100. The customer 118 can remove products from the basket 124, such as avocado 120, and pass such products over the flatbed 114. The flatbed 114 can include the one or more scanning devices 116, which can be configured to scan images of product labels, such as barcode 122 on the avocado 120. Thus, the customer 118 can scan the avocado 120's barcode 122 at the POS terminal 103 using the one or more scanning devices 116 (step A, 130). The POS terminal 103 can identify the product associated with the scanned barcode 122 (step B, 132). For example, the POS terminal 103 can look up, in a data store (e.g., products information data store 930 in FIG. 9), a product that corresponds to the scanned barcode. The POS terminal 103 can automatically transmit the scanned barcode and/or product identification to the computing system 102 for further processing, as described herein (step C, 134). The computing system 102 can also access or otherwise request the scanned barcode and/or product identification from the POS terminal 103 in step C (134).

Once the product associated with the barcode 122 is identified, the POS terminal 103 can update the customer 118's bill with a price of the associated product. The updated bill can be outputted on the display screen 113. In the example of FIG. 1, once the barcode 122 is scanned (step A, 130), the POS terminal 103 may identify that a red bell pepper is associated with the scanned barcode 122 in the data store by performing a lookup function (step B, 132). As a result, a price associated with the red bell pepper can be outputted at the display screen 113, even though the customer 118 is purchasing the avocado 120. The customer 118 may have switched the actual barcode of the avocado 120 with the barcode 122 of the red bell pepper.

As another example, when the barcode 122 is scanned (step A, 130), the POS terminal 103 can identify that an avocado (such as the avocado 120) is associated with the scanned barcode 122 by performing the lookup function in the data store (step B, 132). The price associated with the avocado 120 can be outputted for display at the display screen 113. In this example, the customer 118 did not engage in ticket switching since the scanned barcode 122 matches the avocado 120 that is stored in the data store.

The customer 118 can continue scanning barcodes or other product labels until the basket 124 is empty (steps A-B can be repeated). All the scanned barcodes and/or product identifications can be transmitted to/accessed by the computing system 102 at one time in batch (step C, 134), for example, once the customer 118 indicates that they are done scanning products (e.g., the customer selects an option on the display screen 113 to finish or complete the transaction). The scanned barcodes and/or product identifications can also be transmitted to/accessed by the computing system 102 as the customer 118 scans each barcode in real-time.

The overhead camera 110 can identify when a scanning event occurs at the checkout lane 100 (step D, 136). The overhead camera 110 can detect a flashing light or another optical signal that can originate from the POS terminal 103 and/or the scanning devices 116. The flashing light or other optical signal can indicate that a scanning event has taken place. For example, when the scanning device 116 scans the barcode 122, light can be projected, from a light source of the scanning device 116, onto the barcode 122. The light can illuminate the barcode 122 such that the barcode 122 can be identified and captured by the scanning device 116. The light projection can be detected by the overhead camera 110, and the overhead camera 110 can be configured to identify that a scanning event occurred based on detecting that light projection.

Figure 10A:
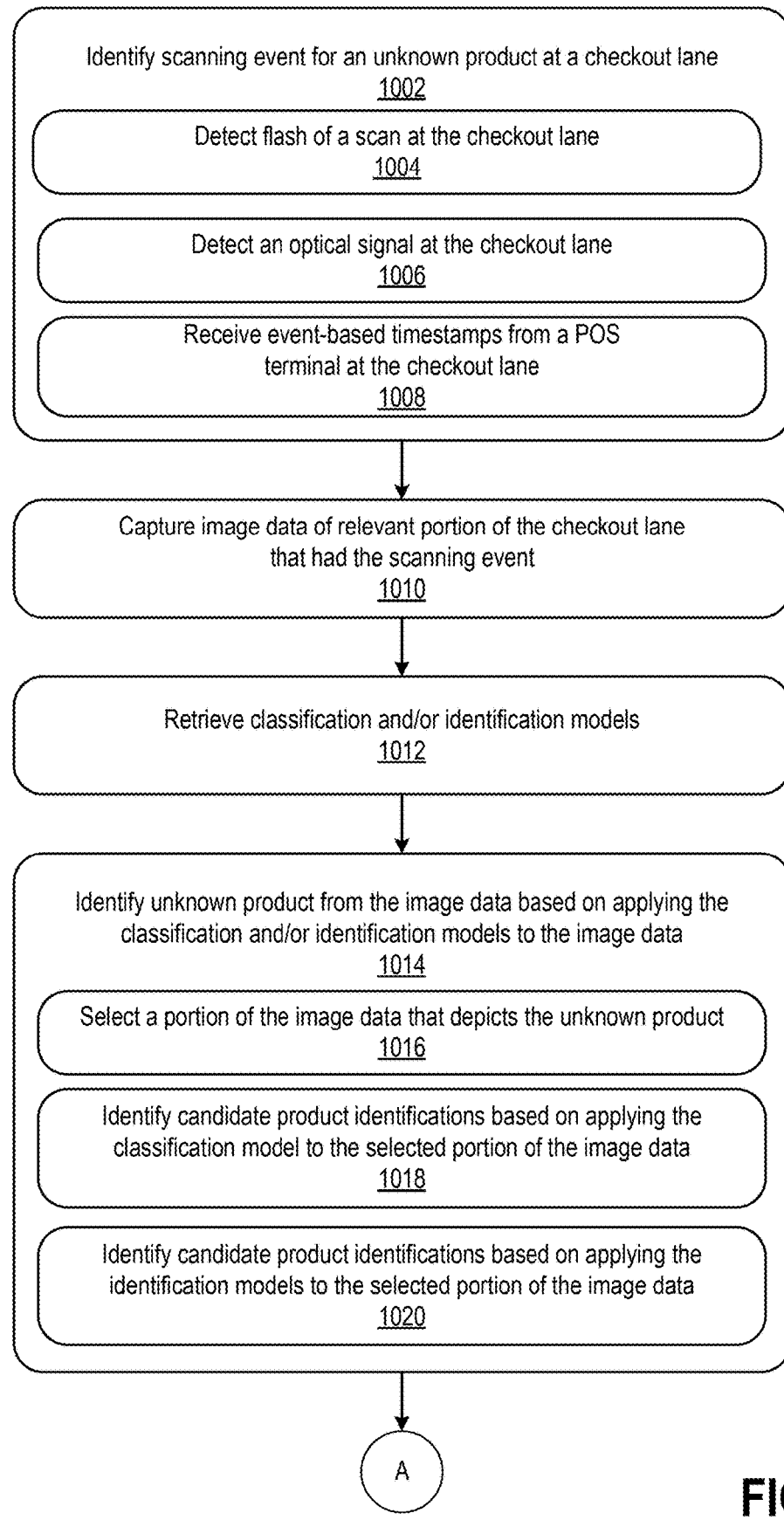
FIGS. 10A-B is a flowchart of a process for determining whether an imaged product matches a scanned product label.
Figure 10B:
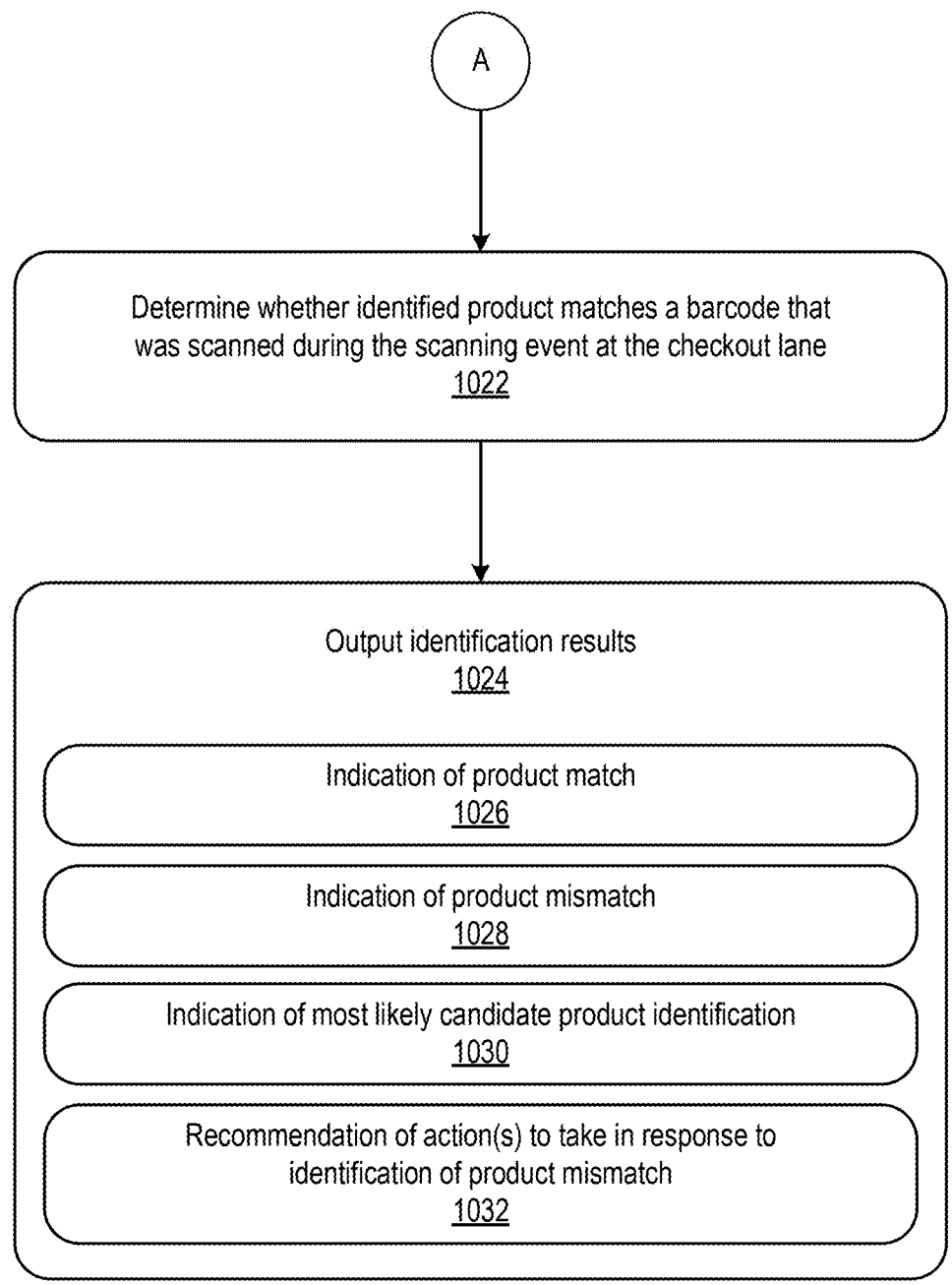

The overhead camera 110 can also identify that a scanning event occurred using one or more other techniques, such as receiving event-based timestamps from the POS terminal 103 (e.g., refer to FIGS. 10A-B). As another example, the overhead camera 110 and/or the computing system 102 can send a notification to the POS terminal 103 at predetermined times, where the notification includes a request for any scanning events that might have occurred during a predetermined period of time. If the POS terminal 103 identifies that scanning events did occur during the predetermined period of time, the POS terminal 103 can transmit timestamps for each of the scanning events to the computing system 102. The computing system 102 can use those timestamps to identify at which points in time the overhead camera 110 captured image data of the scanning events. The image data captured at those points in time can then be used by the computing system 102 to identify the products and determine whether they match the scanned barcodes.

Once the overhead camera 110 identifies the scanning event (step D, 136), the overhead camera 110 can capture image data (e.g., images, video feeds) of a scanning area of the checkout lane 100 (step E, 138). The scanning area can include the flatbed 114 and/or any other portion or area surrounding the checkout lane 100 where the scanning event was detected. The image data can be processed by the computing system 102 in order to identify a portion of the image data that includes the avocado 120 that is being purchased by the customer 118.

Sometimes, the overhead camera 110 can continuously capture image data of the scanning area of the checkout lane 100. Therefore, when the scanning event is identified in step D (136), the overhead camera 110 can select or otherwise identify a portion of the captured image data that corresponds to a same timestamp at which the scanning event was detected. The captured image data or the selected portion of the image data can be transmitted to the computing system 102 for further processing and use in making product identification and matching determinations.

The computing system 102 can receive the image data from the overhead camera 110 (step F, 140). The image data can be received in real-time, as it is captured by the overhead camera 110 and for each product scan. Sometimes, the image data can be received at predetermined time intervals. For example, multiple image data can be received in batch after multiple product scans are made. In yet some implementations, multiple image data can be received in batch after the customer 118 has completed scanning all the products that the customer 118 is purchasing.

The computing system 102 can retrieve one or more product identification models from a models data store 104 (step G, 142). For example, the computing system 102 can retrieve a machine learning classification model, as described further in reference to FIGS. 3-5. As another example, the computing system 102 can retrieve one or more machine learning product identification models, as described further in reference to FIGS. 6-7. Using the one or more retrieved models, the computing system 102 can identify the product(s) that appear in the image data (step H, 144) (e.g., refer to FIGS. 4, 7, and 10A-B).

The computing system 102 can determine whether the product(s) identified from the image data matches the scanned barcode(s) (step I, 146). For example, the computing system 102 can access the scanned barcodes and/or product identification(s) from the POS terminal 103 (step C, 134) at any time before determining whether the product(s) matches the scanned barcode(s) (step I, 146). The computing system 102 can compare the accessed product identification(s) to the product(s) identified from the image data to determine whether they match (step I, 146). As an example, when the computing system 102 identifies the product from the image data (step H, 144), the applied identification model(s) can output confidence values indicating a likelihood that the product is one or more known products. In step I (146), the computing system 102 can determine whether any of the confidence values (e.g., a highest confidence value and/or one or more of the highest confidence values) are associated with a known product that corresponds to the scanned barcode(s). If any of the confidence values associated with the known products correspond to the scanned barcode(s), then the computing system 102 can determine that the imaged product(s) matches the scanned barcode(s) (step I, 146). If any of the confidence values associated with the known products do not correspond to the scanned barcode(s), then the computing system 102 can determine that the imaged product(s) does not match the scanned barcode(s).

In the example depicted in FIG. 1, where the POS terminal 103 identifies the barcode 122 to be associated with a red bell pepper, the computing system 102 can apply one or more identification models to image data of the avocado 120 (step H, 144). The computing system 102 can identify the avocado 120 as an avocado based on application of the one or more identification models. For example, the computing system 102 can identify one or more candidate products that the avocado 120 may be. As an illustrative example, the candidate products can include an avocado, a lime, and a green bell pepper. Based on application of the one or more identification models, the computing system 102 can assign confidence values to each of these candidate product identifications. For example, the avocado can have the highest confidence value. The lime can have the lowest confidence value (e.g., because the avocado 120 in the image data appears larger in size relative to an ambient environment than a lime would be in the same ambient environment and a green color of the avocado 120 can be darker than that of the lime). The green bell pepper can be assigned a confidence value between those of the avocado and the lime (e.g., because the avocado 120 in the image data can appear closer in size to the green bell pepper and can be a same color, but they can be different shapes).

The computing system 102 can determine whether the imaged product matches the scanned barcode that is associated with the red bell pepper by comparing the confidence values of the candidate product identifications to confidence value(s) for the red bell pepper (step I, 146). The computing system 102 can start with the highest confidence value and determine whether that matches or is close to the confidence value(s) for the red bell pepper. The computing system 102 can do this for each of the candidate product identifications. Since none of the confidence values align with the confidence value(s) of the red bell pepper, the computing system 102 can determine that the imaged product does not match the scanned barcode 122. The computing system 102 can also determine that the imaged product is likely the candidate product identification with the highest confidence value. In this example, the computing system 102 can therefore determine that the imaged product is likely an avocado (which had the highest confidence value), not the red bell pepper associated with the barcode 122 that the customer 118 scanned.

The computing system 102 can output identification results (step J, 148). The identification results can indicate whether the imaged product(s) matches the product barcode(s). The identification results can also include one or more candidate product identifications and/or a most likely candidate product identification for the imaged product(s). The computing system 102 can transmit the identification results to a computing device of AP, such as a mobile device, smartphone, laptop, tablet, or computer. AP can use the identification results to determine appropriate action to take with regards to the customer 118. For example, if the computing system 102 identifies a mismatch between the scanned barcode(s) and the imaged product(s), AP can determine that the customer 118 engaged in ticket switching. AP may then decide to apprehend the customer 118 before they leave the store. AP can also decide to monitor the customer 118 whenever the customer 118 returns to the store in the future to see whether the customer 118 continues to engage in ticket switching.

AP can also determine a gravity or seriousness of the ticket switching. AP can take different actions based on the assessed gravity of the ticket switching. For example, the more serious the ticket switching, the more likely AP will decide to apprehend the customer 118 before the customer 118 leaves the store. The less serious the ticket switching, the more likely AP may decide to merely monitor the customer 118 whenever they return to the store to see whether they engage in ticket switching again. As an illustrative example, AP can find ticket switching more serious if the customer 118 swapped a barcode of a TV with a barcode of a chair, where the chair is considerably less expensive than the TV. On the other hand, AP can find ticket switching less serious if the customer 118 swapped a barcode of a bag of trail mix with a barcode of a pack of gum, where the pack of gum is less expensive than the bag of trail mix. In the example depicted in FIG. 1, AP can find the customer 118's swap of a barcode for the avocado 120 with the barcode 122 of the red bell pepper as less serious ticket switching, especially if the avocado 120 and the red bell pepper are similar in price. AP may decide that they do not need to apprehend the customer 118 at this time. Instead, AP may decide to monitor the customer 118 when they return to the store in the future to see whether the customer 118 engages in ticket switching and/or more serious ticket switching.

When the computing system 102 outputs identification results to the computing device of AP, images captured by the camera 112 embedded in the display screen 113 can also be transmitted to AP. For example, these images can be transmitted to the computing system 102, which can include these images in the outputted identification results. The computing device of AP can also request the images from the camera 112 embedded in the display screen 113. Sometimes, the camera 112 can automatically transmit the images to the computing device of AP. When the computing system 102 identifies that the product does not match the scanned barcode (step I, 146), the computing system 102 can transmit a notification to the camera 112. Receiving the notification can trigger the camera 112 to capture images of the customer 118 at the checkout lane 100. The camera 112 can then transmit these captured images of the customer 118 to the computing system 102 and/or the computing device of AP. AP can use the images of the customer to objectively and positively identify the customer 118 for apprehension and/or monitoring purposes.

Steps G-J may be performed by the computing system 102 in real-time for each product as the product is scanned at the checkout lane 100. One or more of the steps G-J can also be performed at one time after all the products are scanned at the checkout lane 100. One or more of the steps A-J can also be performed in parallel. One or more of the steps A-J can also be performed at same or different times during a checkout process.

FIG. 2 is a conceptual diagram of a checkout area 200 having multiple overhead cameras 110A-B. The checkout area 200 can have any number of overhead cameras. The number of overhead cameras can also vary from store to store and/or based on a size of the checkout area 200. In the example checkout area 200 in FIG. 2, overhead camera 110A has a FOV 202A that includes checkout lanes 100A, 100B, 100D, and 100E. Overhead camera 110B has a FOV 202B that includes checkout lanes 100C and 100N. Other configurations are also possible. For example, as depicted in FIG. 1, one overhead camera is trained on one checkout lane. As other examples, each overhead camera can be trained on an equal number of checkout lanes and/or checkout lanes that appear in series (e.g., down a line). As an illustrative example, the overhead camera 110A can be trained on the checkout lanes 100A, 100B, and 100C while the overhead camera 110B can be trained on the checkout lanes 100D, 100E, and 100N.

During a checkout process, a customer can scan product at any of the checkout lanes 100A-N, such as the checkout lane 100N (step A, 204). The camera 110B, which has the FOV 202B that includes the checkout lane 100N, can detect a scanning event at the checkout lane 100N (step B, 206). As described in reference to FIGS. 1, 9, and 10A-B, the camera 110B can detect the scanning event based on identifying a light signal or other optical signal coming from a direction of the checkout lane 100N. The light signal or other optical signal can be generated by a POS terminal or scanning device that is used by the customer when scanning the products (step A, 204).

Based on detecting the scanning event in step B (206), the camera 110B can capture image data from the FOV 202B (step C, 208). The image data can include the checkout lane 100N where the scanning event was detected. Since the FOV 202B covers a portion of the checkout area 200 rather than just one of the checkout lanes 100A-N, the image data may also include the checkout lane 100C and any other checkout lanes that appear in the FOV 202B of the camera 110B. The camera 110B can then transmit the image data to the computing system 102 (step D, 210).

Upon receiving the image data, the computing system 102 can identify which checkout lane is where the scanning event occurred (step E, 212). For example, the computing system 102 can receive one or more event-based timestamps (e.g., which can be part of transaction information, such as a current bill of the customer) from a POS terminal at the checkout lane 100N. The event-based timestamp can indicate a time at which a product was scanned. The computing system 102 can then match the event-based timestamp with a timestamp at which the image data depicts a product being scanned at one of the checkout lanes. The computing system 102 can then identify that checkout lane as the one where the scanning event occurred. As another example, the received image data can depict the light signal or other optical signal that the camera 110B used for detecting the scanning event. The computing system 102 can identify which checkout lane in the image data the light signal or other optical signal originated from. As yet another example, the camera 110B can identify the checkout lane where the scanning event was detected and transmit this identification to the computing system 102.

Once the computing system 102 identifies the checkout lane 100N as being the location where the scanning event was detected, the computing system 102 can extract a portion of the image data having the unknown product scanned at the checkout lane 100N (step F, 214). The computing system 102 can use one or more image processing and/or image extraction techniques to select the portion of the image data that depicts the checkout lane 100N. More so, the computing system 102 can extract the portion of the image data that includes a flatbed having the product that was scanned. The computing system 102 can also use one or more machine learning models that are trained to identify a product from surrounding features, objects, and/or ambient environment. Therefore, using the machine learning models, the computing system 102 can extract only the product from the image data and use that extracted portion of the image data for further processing described throughout this disclosure. Although the image data may be lower resolution (e.g., because the overhead cameras 110A-B are low resolution cameras, because the camera 110B has a wide FOV 202B and the product appears small in the captured image data, etc.), the computing system 102 can be trained to accurately identify products from low resolution image data.

The computing system 102 can then perform product matching techniques using the extracted portion of the image data and product identification(s) (e.g., scanned barcodes, product information, etc.) that can be received from the POS terminal at the checkout lane 100N (step G, 216) (e.g., refer to FIGS. 4, 7, 8, and 10A-B). The computing system 102 can therefore determine whether the customer engaged in ticket switching at the checkout lane 100N. The computing system 102 can also identify what product the customer is likely purchasing.

Figure 3:
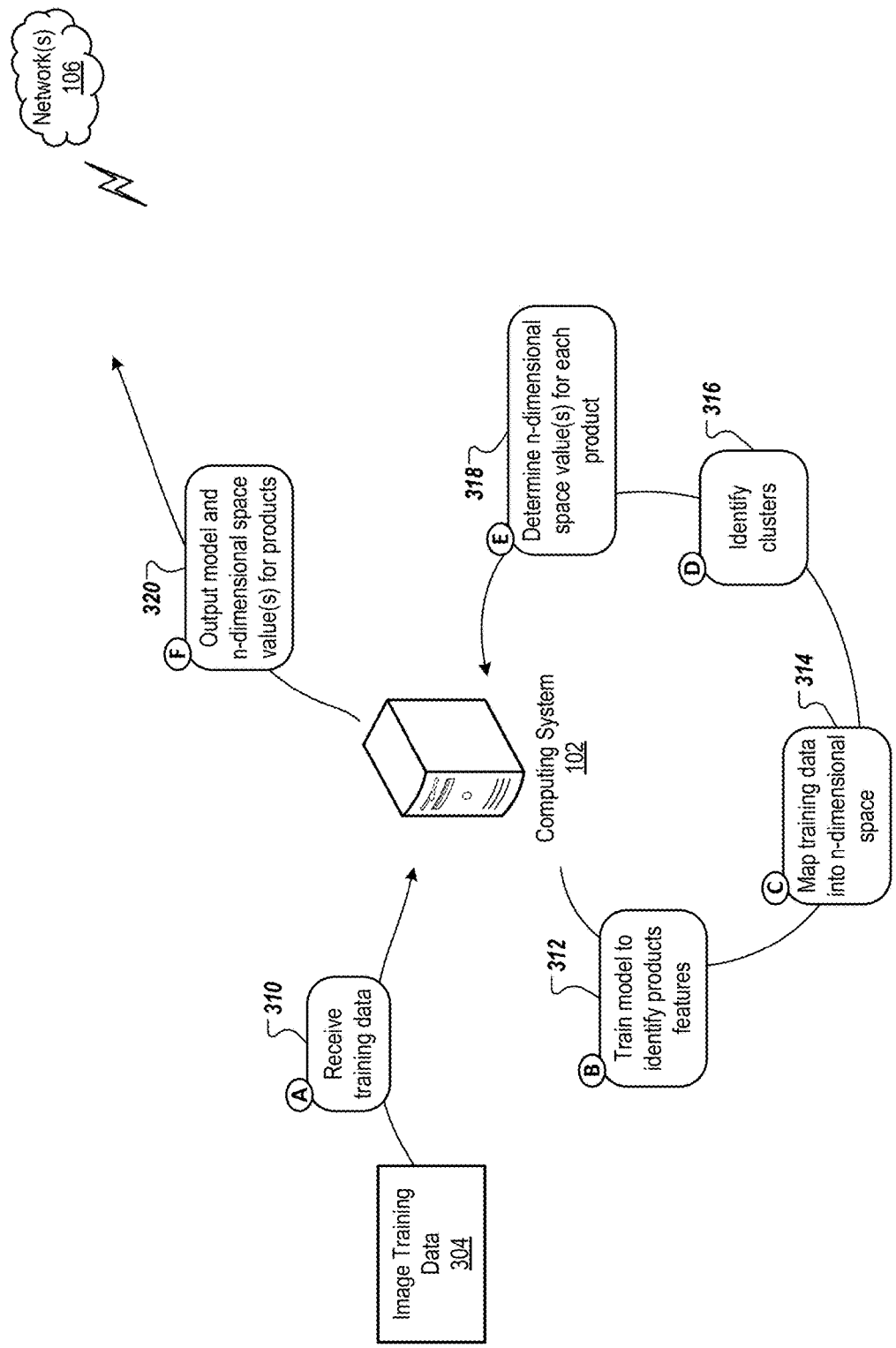
FIG. 3 is a conceptual diagram for training a machine learning product classification model.

FIG. 3 is a conceptual diagram for training a machine learning product classification model. The computing system 102 can be configured to train the model. One or more other computing systems can also be used to train the model. Such computing systems can be different than the computing system 102. The computing system 102 and/or the other computing systems can be a remote computing system, server, network of computers or servers, cloud service, and/or edge computing device.

The computing system 102 can receive image training data 304 (step A, 310). The image training data can be image data (e.g., still images, video feeds) of every product that has been scanned at checkout lanes across the network of stores. The image training data can therefore be image data of every verified product scan, for example, where an imaged product is verified to match a scanned barcode. The image data can be labeled or otherwise annotated with the verified product information, such as the barcode, SKU, or other product identifying information.

The image training data can include image data that is captured by similar devices. The similar devices can be a plurality of overhead cameras that are installed in checkout areas across different stores. The plurality of overhead cameras can be installed in similar or same positions in the checkout areas. The plurality of overhead cameras can capture image data at a same resolution (e.g., 200×200) as well as a same angle and/or FOV. The computing system 102 can therefore train the product classification model using consistent and uniform, low resolution image data. For example, the computing system 102 can receive all images of scanned products that were captured by the overhead cameras 110 (e.g., refer to FIGS. 1-2) at different checkout lanes in the network of stores. These images can all have uniform and consistent FOV and lighting, thereby making training easier and more accurate.

Sometimes, each checkout area can have a different configuration of the plurality of overhead cameras. Regardless, the computing system 102 can still use images captured by the overhead cameras to train the product classification model.

The computing system 102 can also receive images of scanned products from devices that are not similar. The computing system 102 can receive images of scanned products that were captured by one or more cameras that are positioned at or otherwise part of a checkout lane. For example, the computing system 102 can receive image data from the camera 112 embedded in the display screen, a camera configured to a handheld scanning device 116, a camera positioned or otherwise attached to the light pole 108, a camera embedded in the flatbed 114, etc.

The computing system 102 can also receive image training data that includes images captured by depth sensing cameras and/or thermal cameras. Images captured by the depth sensing cameras can be advantageous to determine placement and positioning of products relative to features in an ambient environment, including components of the checkout lane (e.g., the flatbed 114, the one or more scanning devices 116, etc.) and parts of a customer's body (e.g., hands, arms, etc.). The depth sensing cameras can include LiDAR technology. The depth sensing cameras can be configured to emit infrared light and to generate a depth map depicting depth of field and relativity of product positioning and placement. The thermal cameras capture images that can be used to generate heat maps. Using such heat maps, the computing system 102 can train the model to detect differences between customer hands (which are warmer than products) and products (which are colder than human body parts).

The computing system 102 can train the product classification model using a combination of images from the overhead camera 110 and one or more other devices described above. The trained model can then be deployed to identify products that are scanned at checkout lanes across the network of stores. As an illustrative example, the computing system 102 can train the model using image data from only one type of device (e.g., the overhead cameras 110 in a plurality of stores). The computing system 102 can then verify or otherwise improve the model using image data received from other types of devices described above.

Still referring to FIG. 3, once the computing system 102 receives the image training data 304 in step A (310), the computing system 102 can train the product classification model to identify product features in the image data (step B, 312). For example, the computing system 102 can apply one or more machine learning models to the image training data to train the product classification model to identify a product and differentiate the product from a surrounding ambient environment. The computing system 102 can also apply machine learning models to the image training data to train the product classification model to identify product features. The product features can include different types of corners (e.g., round corners, sharp corners, etc.), different types of edges (e.g., round edges, smooth edges, sharp edges, etc.), different font types, colors, light reflectivity, product labels, and/or shape. As mentioned above, since the image training data can include image data captured by similar devices having consistent and uniform or similar FOVs and lighting (e.g., the overhead cameras 110), product features can be more easily and accurately identified. The computing system 102 can identify product features that are specific to one or more particular products. The computing system 102 can identify product features that are generic to a grouping or classification of products. For example, the computing system 102 can identify a unique label of a candy bar as a product feature. The computing system 102 can also identify an oblong yellow shape of both a zucchini and a banana.

The computing system 102 can map the image training data 304 into n-dimensional space (step C, 314). A number of dimensions in space can depend on a number of features that are identified. For example, if 3 features are identified, then the image training data 304 can be mapped into 3-dimensional (3D) space, where each dimension represents a different feature. One or more products can have the same identified features, regardless of whether they are the same product. In the example above, the zucchini and the banana can have the same features as oblong shape and yellow coloring. When mapping the zucchini and the banana into n-dimensional space, they can be closer to each other than the candy bar, which can have a rectangular shape and a bright red wrapper with bold white font. Mapping the image training data into n-dimensional space can therefore indicate that the zucchini and the banana are more similar to each other than either is to the candy bar.

The computing system 102 can then identify clusters in n-dimensional space (step D, 316). In other words, the computing system 102 can identify where points or values associated with product features in each of the image training data fall in n-dimensional space. Where there is an abundance of points or values, a cluster, it is more likely that the product appearing in the image training data has the feature(s) identified in that region of n-dimensional space.

In the example of the candy bar, banana, and zucchini, mapping any images of the candy bar into n-dimensional space can result in a grouping of points or values in the dimensions associated with features such as rectangle shape and bright red coloring/wrapping. These points or values can be identified as a cluster associated with the candy bar.

Mapping any images of the banana and zucchini in n-dimensional space can result in groupings of points or values closer to the dimensions associated with an oblong shape and yellow coloring. For example, the bananas can also be mapped into dimensions associated with features such as angle of curvature, stem, and green coloring. The more image training data of bananas that falls into these other dimensions, the more likely a cluster of points or values will form in these dimensions to identify the banana, thereby differentiating the banana from a cluster of points or values around the oblong shape and yellow coloring dimensions that represent the zucchini.

Once the clusters are identified, the computing system 102 can determine n-dimensional space values for each product of the image training data 304 (step E, 318). The n-dimensional space values can be vector values, bounding boxes, planes, or some other value that can define an area or volume in n-dimensional space. The n-dimensional space values can also be standard deviations and/or other statistical analysis of points or values that have been mapped in the n-dimensional space. For example, the n-dimensional space values can also be ranges of values. As an example, in a cluster, the computing system 102 can identify vector values of a centroid. The computing system 102 can then determine a distance between each nearest neighbor vector values and the centroid's vector values. By averaging the distances, the computing system 102 can determine average vector values for the cluster.

In the example of the candy bar, banana, and zucchini, the computing system 102 can identify vector values for the cluster associated with the candy bar, the cluster associated with the banana, and the cluster associated with the zucchini. Each product can therefore be identified by different vector values.

The computing system 102 can quantify accuracy of the product classification model based on any of a variety of techniques, such as comparing distances between each point in a cluster to an average point for that cluster. The smaller the distances (and/or an average of all the distances), then the more likely the model can accurately identify the product associated with the cluster.

Finally, the computing system 102 can output the product classification model and n-dimensional space values for each of the products (step F, 320). The computing system 102 can also store the product classification model and n-dimensional space values for the products in a data store. The computing system 102 can then use the product classification model during runtime to identify products as they are scanned at checkout lanes across the network of stores (e.g., refer to FIG. 4).

Figure 4:
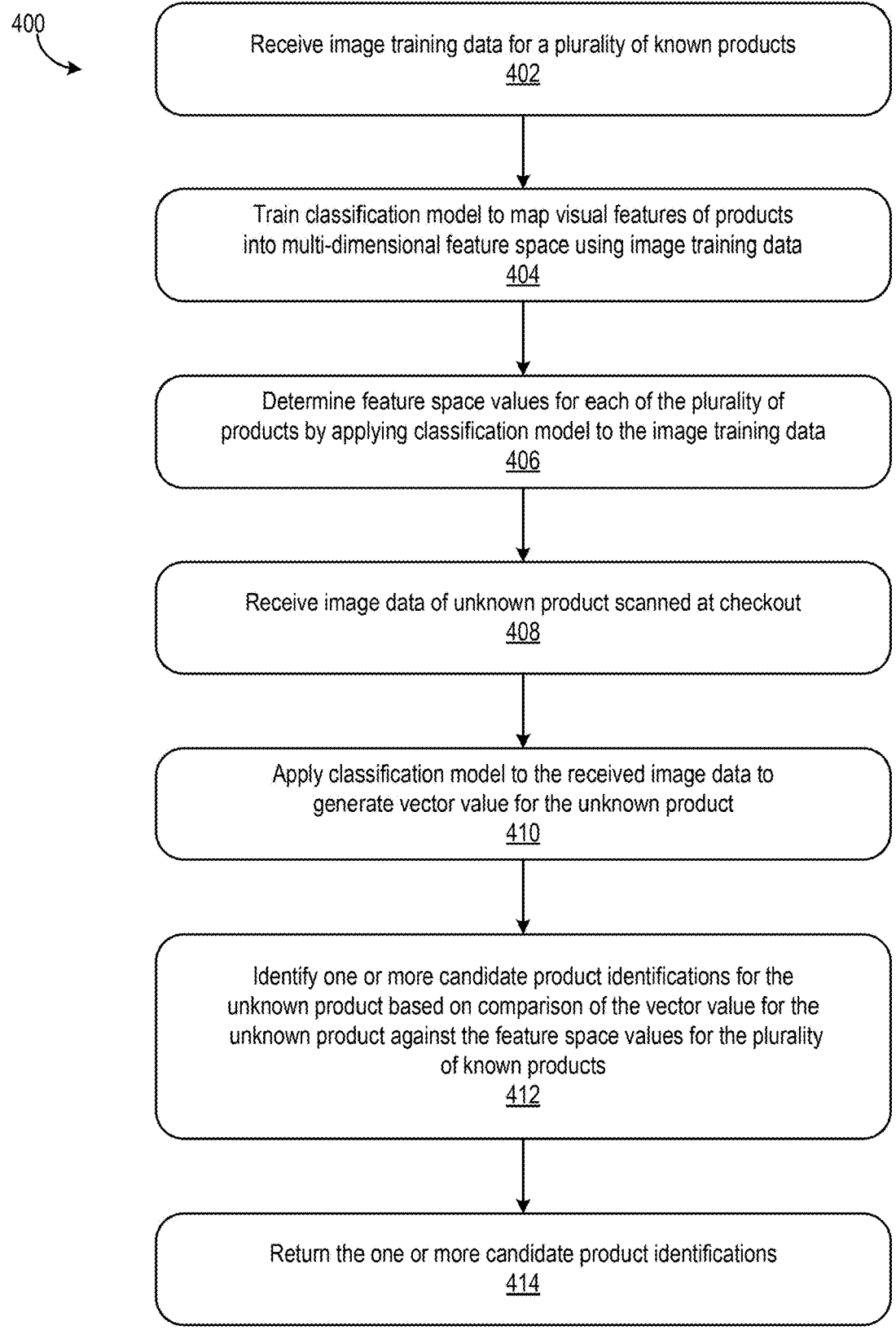
FIG. 4 is a flowchart of a process for identifying a product using the machine learning product classification model.

FIG. 4 is a flowchart of a process 400 for identifying a product using the machine learning product classification model. The process 400 can be performed by the computing system 102. Sometimes, the overhead camera 110 can be integrated with or otherwise part of the computing system 102. Thus, the process 400 can be performed by the overhead camera 110 and the computing system 102. One or more blocks in the process 400 can also be performed by one or more other computing systems, servers, devices, cloud services, and/or edge computing devices. For illustrative purposes, the process 400 is described from a perspective of a computing system.

Referring to the process 400, before runtime use in settings where products are scanned at checkout lanes, the computing system can generate and train the product classification model. To do so, the computing system can receive image training data for a plurality of known products (402). Refer to step A (310) in FIG. 3. The image training data can already be annotated and/or labeled. The image training data can also be classified based on product type and/or category of products. For example, one or more product features can be identified, labeled, annotated, and/or classified by the computing system in 402. Refer to step B (312) in FIG. 3.

The computing system can train a product classification model to map visual features of the products into multi-dimensional feature space using the image training data (404). Refer to step C (314) in FIG. 3.

In 406, the computing system can determine feature space values for each of the plurality of products by applying the classification model to the image training data. For example, the computing system can map the image training data into n-dimensional space, identify clusters, and determine n-dimensional space value(s) for each product in the image training data. The computing system can also output the classification model and n-dimensional space value(s) for the products. As described herein, the outputted model and value(s) can then be used by the computing system to identify products that are scanned at checkout lanes across a network of stores. Refer to steps D-F (316-320) in FIG. 3.

During runtime when customers are scanning products at checkout lanes across the network of stores, the computing system can receive image data of one or more unknown products that are scanned during checkout by the customers (408). Refer to FIGS. 1, 2, and 10A-B for further discussion about capturing the image data by the overhead cameras 110 upon detection of a scanning event.

The computing system can apply the machine learning product classification model to the received image data to generate vector values for the unknown product in 410. The classification model can be trained to identify features of the unknown product in the image data and map those features into n-dimensional space, as described in reference to FIG. 3. Mapping the features of the unknown product into n-dimensional space can return a vector, multiple vector values, a bounding box, and/or one or more other values that can be used to define an area or volume of n-dimensional space for that unknown product. The returned value(s) of the unknown product can then be used to determine how similar the value(s) are to values of one or more known products.

In 412, the computing system can identify one or more candidate product identifications for the unknown product. For example, the identification can be based on a comparison of the vector value for the unknown product against the feature space values for the plurality of known products. The computing system can compare vector values, labels, centroids, and/or bounding boxes of the unknown product to such values of the one or more known products. Greater similarity in any of such values can indicate that the unknown product is likely the known product that it is being compared to. The less similar such values, the more likely the unknown product is not the known product that it is being compared to.

The computing system can, for example, perform a trigonometric or statistical analysis on a value representing a feature of the unknown product and compare that to an expected or projected value for one or more actual or known products. Comparison of values can include determining a distance between the value of the unknown product and the values of the actual products. Vector values of the unknown product can be floating values that indicate a confidence level that the unknown product is the actual product. For example, a smaller distance between vector values of the unknown product and expected values for the actual product can result in a higher confidence that the unknown product is the actual product.

As another example, the computing system can define a bounding box for the actual product using the product classification model. If points or other values of the unknown product fall within the bounding box, then the computing system can identify the actual product as a candidate product identification. The computing system can also identify the actual product as a candidate product identification if the points or other values of the unknown product fall within a threshold distance from the bounding box of the actual product. One or more other trigonometric or statistical analyses can be performed in order to identify the candidate product identifications using the product classification model.

In 414, the computing system can return the one or more candidate product identifications. The computing system can output a list having the most likely products that the unknown product may be. For example, the computing system can output a list with top 5 candidate product identifications. Any other quantity of candidate product identifications can be outputted. For example, the output can include the most likely candidate product identification. As another example, the output can include a list of top 10 candidate product identifications.

The returned candidate product identifications can be transmitted to and/or outputted at a POS terminal of the checkout lane where the product was scanned, a display screen at the checkout lane, and/or at a device of an in-store employee. For example, when the candidate product identifications are outputted at the POS terminal or the display screen at the checkout lane, the customer can have an option to select which product the customer is actually trying to purchase. This output can therefore be used to dissuade or otherwise prevent the customer from engaging in ticket switching during the checkout process.

Sometimes, the computing system can output the candidate product identification having the highest confidence value (e.g., the most likely match for the scanned product). When this candidate product identification is outputted at the POS terminal and/or the display screen of the checkout lane, the candidate product identification may be automatically added to the customer's transaction such that the customer pays a price of the candidate product identification instead of whatever price was identified when the customer scanned the product label during the checkout process. As a result, this output can prevent the customer from engaging in ticket switching.

Outputting the candidate product identifications at the computing device of in-store employees can be beneficial for the in-store employees to monitor potential ticket switching events. The in-store employees can be AP, as described above. AP can review transaction information from the POS terminal, the candidate product identifications, and image data of the customer at the checkout lane in order to determine how to respond to a potential ticket switching event. AP can decide to intervene and stop the customer from leaving the store based on determining that the candidate product identifications are drastically different than the barcode that was scanned during the checkout process.

For example, the candidate product identifications for a scanned product can include headphones, a phone case, and a screen protector (e.g., these products can be identified because they all have similar or same size, rectangular shape, white packaging, and logo). The barcode that was scanned by the customer can be associated with a book that is on sale. AP can determine that the customer is engaging in ticket switching. Since the actual price of the headphones, the phone case, and the screen protector are each significantly higher than the book, AP can decide to stop the customer from leaving the store. After all, the customer is engaging in a more serious ticket switching event.

As another example, the candidate product identifications for a scanned product can include a bag of chips, a bag of popcorn, and a bag of frozen shrimp (e.g., these products can be identified because they all have similar or same size, shape, packaging color, and packaging design). The barcode that was scanned by the customer can be associated with a pack of gum. AP can determine that the customer engaged in ticket switching. However, a price difference between the pack of gum and the candidate product identifications can be minimal or less than a predetermined threshold level, thereby indicating that the customer did not engage in some egregious ticket switching. Instead of apprehending the customer before they can leave the store, AP may decide to merely monitor the customer when the customer returns to the store in the future. If the customer continues to engage in ticket switching and or swaps tickets between products having a greater difference in price, then AP may decide to intervene or perform some other action in response.

Still referring to block 414, the computing system can use the candidate product identifications to improve the product classification model. As described herein, the higher the confidence values, the more likely the product classification model accurately identified the associated product. On the other hand, the lower the confidence values, the less likely the model was accurate. The computing system can therefore use the returned candidate product identifications, the image data of the unknown products, and/or the vector values of the unknown products in order to continuously train and improve the product classification model such that confidence values of future product classifications can be higher and more accurate.

Figure 5:
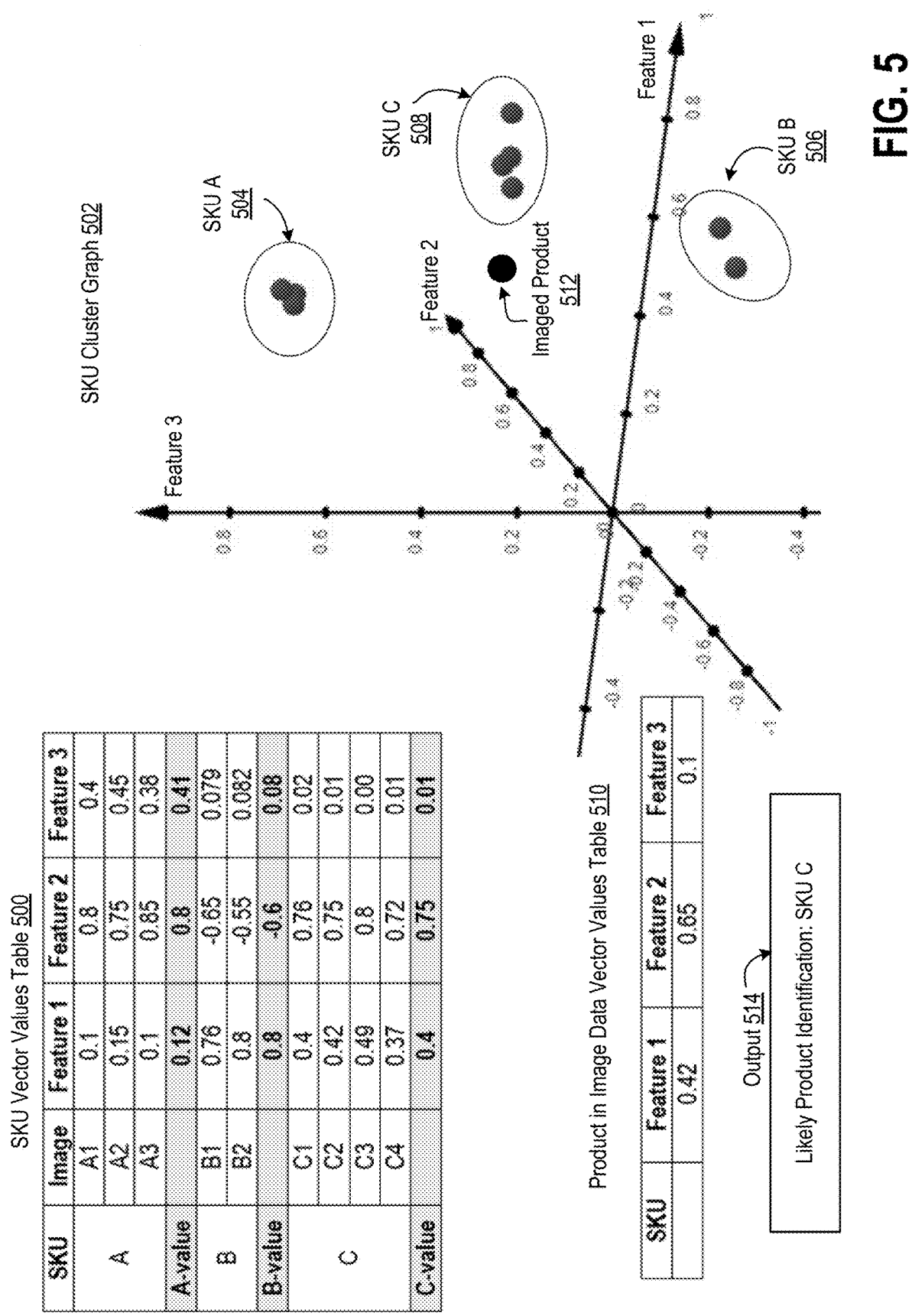
FIG. 5 is a graphical depiction of products mapped in n-dimensional space using the machine learning product classification model.

FIG. 5 is a graphical depiction of products mapped in n-dimensional space using the machine learning product classification model. As mentioned throughout, when training the product classification model, a vector values table 500 can be outputted (e.g., refer to FIG. 3). The table 500 includes values for each known product in image training data that is mapped into n-dimensional space. As an illustrative example, the table 500 identifies products based on SKU. Each product can have a different SKU. In the table 500, 3 known products are mapped into n-dimensional space. One product is identified by SKU A, a second product is identified by SKU B, and a third product is identified by SKU C. Each of the SKUs A, B, and C can also be represented in one or more images (e.g., image training data). For example, SKU A is represented in 3 images: A1, A2, and A3. SKU B is represented in 2 images: B1 and B2. SKU C is represented in 4 images: C1, C2, C3, and C4.

As described herein, a computing system, such as the computing system 102, can identify product features in each of the images A1, A2, A3, B1, B2, C1, C2, C3, and C4. Sometimes, the features can already be annotated and/or labeled in the images. The images A1, A2, A3, B1, B2, C1, C2, C3, and C4 can then be mapped into n-dimensional space, where each dimension of space indicates a different feature. In the example table 500 in FIG. 5, 3 features have been identified. The images A1, A2, A3, B1, B2, C1, C2, C3, and C4 are therefore mapped into 3-dimensional space, as shown in SKU cluster graph 502.

Numeric values can then be assigned, by the computing system, for each feature that appears in the images A1, A2, A3, B1, B2, C1, C2, C3, and C4. In the table 500, numeric values are assigned from −1 to 1. One or more other ranges of values can be used by the computing system. The numeric values can indicate how much of a feature the product in the image likely has. For example, a value less than 1 can indicate that the product likely does not have that feature. A value equal to or closer to 1 can indicate that the feature is very prevalent in the product. When multiple images are associated with a particular product of SKU, the numeric values for each of those images can be averaged to find values for the SKU. One or more other trigonometric and/or statistical analyses can be performed in order to find the aggregate value(s) for the SKU.

In the table 500, the product identified in image A1 is assigned values {0.1, 0.8, 0.4}, representing feature 1, feature 2, and feature 3, respectively. The product in image A2 (which is identified by the same SKU A as the product in image A1) is assigned values {0.15, 0.75, 0.45}. the product in image A3 is assigned values {0.1, 0.85, 0.38}. Based on these values, feature 2 is most prevalent and feature 1 is least prevalent in products that are identified by SKU A.

The product identified in image B1 is assigned values {0.76, −0.65, 0.079}. The product identified in image B2 is assigned values {0.8, −0.55, 0.082}. Based on these values, feature 1 is most prevalent and feature 2 is least prevalent in products that are identified by SKU B.

With regards to SKU C, the product identified in image C1 is assigned values {0.4, 0.76, 0.02}. The product identified in image C2 is assigned values {0.42, 0.75, 0.01}. The product identified in image C3 is assigned values {0.49, 0.8, 0.00}. The product identified in image C4 is assigned values {0.37, 0.72, 0.01}. Based on these values, feature 2 is most prevalent and feature 3 is least prevalent in products that are identified by SKU C.

As mentioned, each of the assigned values for the images A1, A2, A3, B1, B2, C1, C2, C3, and C4 can be mapped into 3D space, as shown in the SKU cluster graph 502. Feature 1 can be on the x axis, feature 2 can be the z axis, and feature 3 can be the y axis. The features can be mapped onto any other axes, as desired by a user and/or determined by the computing system. When the values are graphed, they can begin clustering in certain regions of 3D space. Shorter distances between graphed values can indicate that such features are more likely associated with a particular SKU.

In the graph 502, assigned values for A1, A2, and A3 are all relatively close together (e.g., having short distances between each assigned value), thereby forming SKU A cluster 504. As mentioned above, feature 2 is most prevalent but so is feature 3 in products associated with the SKU A. This is demonstrated by the position of the cluster 504 relative to the z axis (which represents feature 2) and the y axis (which represents feature 3).

Assigned values for B1 and B2 are also relatively close together, thereby forming SKU B cluster 506. As mentioned, feature 1 is most prevalent, which is demonstrated by the position of the cluster 506 relative to the x axis (which represents feature 1).

Assigned values for C1, C2, C3, and C4 are also relatively close together, thereby forming SKU C cluster 508. As mentioned, feature 2 is most prevalent, but so is feature 1, which is demonstrated by the position of the cluster 508 closer relative to the z axis and the x axis.

Moreover, for each of the SKUs, the assigned values are relatively close to each other (+−0.05), which can indicate that the product classification model is likely accurate in identifying products based on features.

Now that clusters 504, 506, and 508 have been identified for each of the SKUs A, B, and C, respectively, the computing system can determine aggregate feature values for each of the SKUs. The computing system can average the values identified in each of the clusters 504, 506, and 508 in order to determine the aggregate feature values. The computing system can also define a bounding box around each of the clusters 504, 506, and 508. The computing system can also identify a centroid point for each of the clusters 504, 506, and 508 and use that centroid point for the aggregate feature values for each SKU. One or more other trigonometric and/or statistical analyses can be used to determine aggregate feature values for the SKUs in n-dimensional space.

In the example of FIG. 5, the assigned values for each of the SKUs are averaged to determine the aggregate feature values. By averaging the assigned values for SKU A, the resulting aggregate feature values are 0.12 for feature 1, 0.8 for feature 2, and 0.41 for feature 3. SKU B's aggregate feature values are 0.8 for feature 1, −0.6 for feature 2, and 0.08 for feature 3. SKU C's aggregate feature values are 0.4 for feature 1, 0.75 for feature 2, and 0.01 for feature 3. The aggregate feature values can be outputted by the computing system with the trained product classification model (e.g., refer to FIG. 3). Thus, during runtime use, the aggregate feature values can be compared to values that are assigned to unknown imaged products to determine which features are most prevalent in the unknown imaged products. By determining which features are most prevalent in the unknown imaged products, the computing system can identify a candidate product identification and/or one or more candidate product identifications.

Still referring to FIG. 5, during runtime use, a product is captured in image data and inputted to the product classification model (e.g., refer to FIG. 4). Output from the model includes product in image data vector values table 510. The table 510 indicates that no SKU has been identified for the product in the image data. Thus, the product is unknown. However, using the product classification model, values were assigned to the product for features 1, 2, and 3. Feature 1 has a value 0.42, feature 2 has a value 0.65, and feature 3 has a value 0.1. Alone, these values may not signify much about the unknown product. However, in comparison to the aggregate feature values that were identified for products associated with SKUs A, B, and C, the feature values of the unknown product in the image data can be used to identify that product.

Accordingly, to compare the feature values of the unknown product in the image data to the aggregate feature values for the SKUs A, B, and C, the feature values of the unknown product can be mapped in 3D space. In the SKU cluster graph 502, imaged product 512 is mapped between the x and z axes, closest to the z axis, which represents feature 2. By comparing values in the graph 502 and the SKU vector values table 500, the computing system can determine that the unknown product in the image data is most similar to the product identified by SKU C. For example, products identified by SKU C have an aggregate feature value of 0.75 for feature 2. The unknown product in the image data has a value of 0.65 for feature 2, which is closest to the aggregate feature 2 value of SKU C in comparison to SKU A (0.8) and SKU B (−0.6). Moreover, the unknown product has a value of 0.42 for feature 1, which is closest to aggregate feature 1 value of SKU C in comparison to SKU A (0.12) and SKU B (0.8). Therefore, the computing system can return output 514.

The output 514 indicates that the likely product identification of the unknown product is SKU C. For example, the output 514 can list the SKUs based on highest confidence value to lowest confidence value. For example, the confidence value can be highest for SKU C. The confidence value can be second highest for SKU A, and the confidence value can be lowest for SKU B. For example, the output 514 can list only one or more most likely product identifications, as described herein.

As an example, SKU A can be associated with zucchini, SKU B can be associated with a red candy bar of a particular brand, and SKU C can be associated with a bag of chips of a particular brand. Feature 1 can be sharp corners, feature 2 can be yellow coloring, and feature 3 can be a narrowly oblong shape. Since the zucchini is closer to a yellow coloring and a narrow oblong shape, features 2 and 3 are most prevalent for the zucchini (SKU A). Since the red candy bar has sharp corners, feature 1 is most prevalent for the candy bar (SKU B). Since the bag of chips of the particular brand can have yellow packaging and somewhat sharp corners, features 1 and 2 can be most prevalent for the bag of chips (SKU C). The unknown product that is imaged can be a soft box container of tortilla chips. The container of tortilla chips can be yellow in color, which makes feature 2 prevalent. Moreover, the container can have somewhat sharp corners, thereby making feature 1 somewhat prevalent. The container may not be narrowly oblong, thereby making feature 3 the least prevalent. As a result, the computing system can identify that the soft box container of tortilla chips is most likely identified as the product associated with SKU C, which is the bag of potato chips.

As shown in this example, computing system can identify which SKU is most likely associated with the imaged product. the computing system can also positively identify the SKU that is associated with the imaged product. In other words, the computing system can return an exact SKU that matches the features identified for the imaged product. Where the product classification model is trained to identify a catalog of products across the network of stores, the computing system can more likely positively identify the imaged product. In this illustrative example, where the product classification model was trained with images of the soft box container of the tortilla chips, the unknown product that is imaged during runtime can have confidence values or vector values that are most similar or otherwise identical to the values of the soft box container of tortilla chips in the image training data.

The example of FIG. 5 illustrates classification model training and product identification using only 3 known products and 3 features. For example, classification model training and/or product identification can be based on one or more additional and/or fewer products and one or more additional or fewer features. For example, the model can be trained using a catalog of all products in a store. The model can be trained using image data of all products that have been scanned and verified in the store and/or across a network of stores. For example, the model can be trained to identify a predetermined number of features. In another example, the model can be trained to identify any number of features. Other configurations are also possible.

Figure 6:
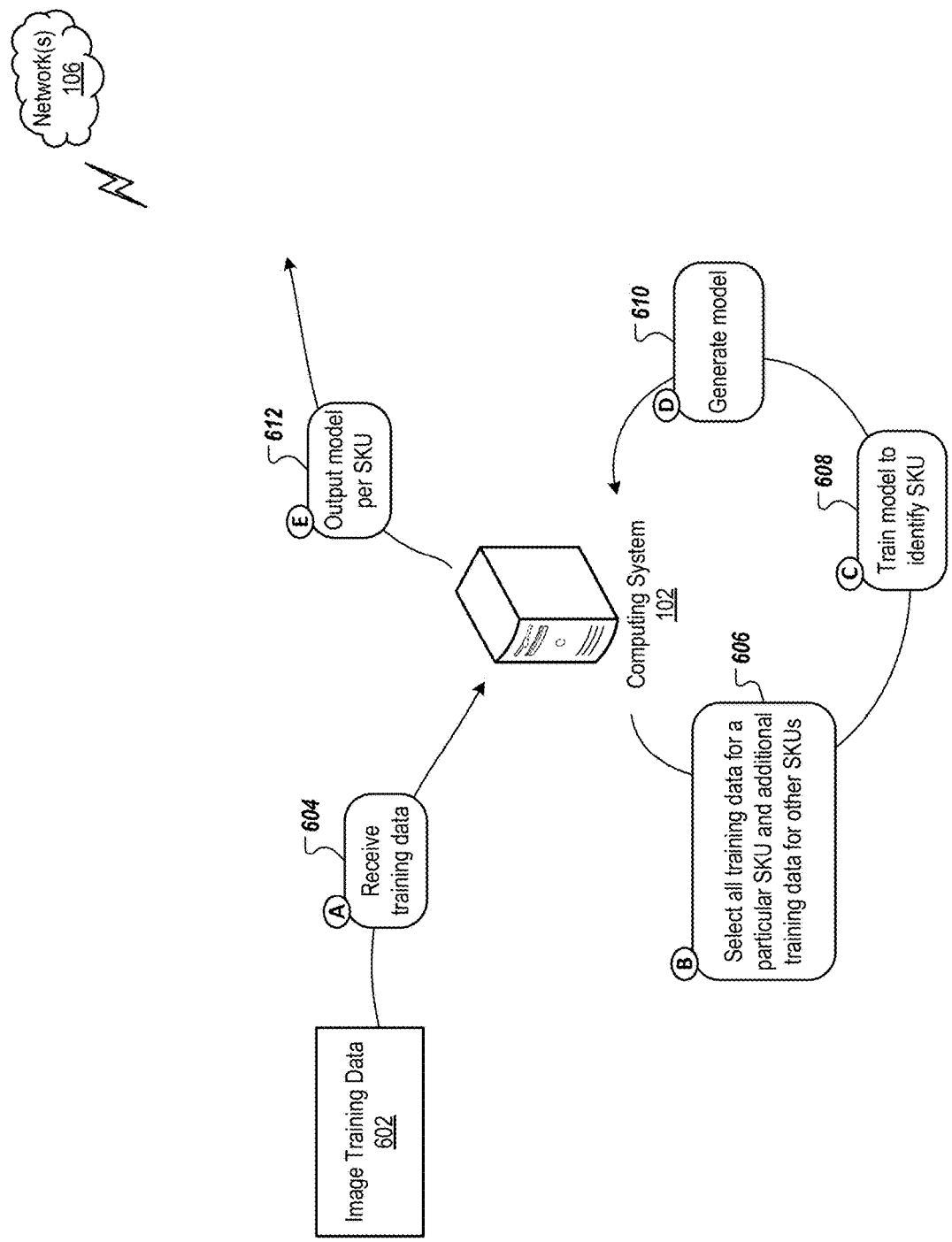
FIG. 6 is a conceptual diagram for training machine learning product identification models.

FIG. 6 is a conceptual diagram for training machine learning product identification models. Training of such models can be performed by the computing system 102. As described herein, the computing system 102 can generate and train a product identification model per every verified or known SKU (e.g., product, product label, barcode). As described in reference to training the product classification model in FIG. 3, the product identification models can also be generated by one or more other computing systems, remote computers, cloud services, and/or edge computing devices.

Any of a variety of configurations can be used to train the models described herein. For example, one computing system can train the product classification model described in reference to FIGS. 3-5 and another, different computing system can train the plurality of product identification models as described in FIGS. 6-7. Sometimes, the training can be performed by a computing system at a first store in a network of stores. The models generated by the computing system can then be transmitted to other computing systems in other stores in the network of stores. As a result, although training may occur at one computing system (e.g., using image training data from the one store or image training data from a plurality of stores in the network of stores), the same generated models can be used by different computing systems across the network of stores.

Referring to FIG. 6, the computing system 102 can receive image training data 602 of single, verified products (step A, 604). Refer to FIG. 3 for further discussion about the image training data. The image training data 602 can already be annotated and/or labeled. The computing system 102 can annotate and/or label the image training data 602. Sometimes, one or more in-store employees can annotate and/or label the image training data 602.

The computing system 102 can select all training data for a particular SKU and additional training data for other SKUs (step B, 606). The computing system 102 can then generate a product identification model per SKU. As an example, SKU A can have a product identification model that was trained using image training data 602 of just the product(s) having the SKU A. Similarly, SKU B can have a product identification model that was trained using image training data 602 of just the product(s) having the SKU B. The image training data 602 that is selected to train each product identification model can include images of products that do not have the SKU that the model is being trained to identify, which can be advantageous to train the model to identify features that are associated with the SKU and determine which features are not associated with the modeled SKU.

The computing system 102 can then train the product identification model for the particular SKU to identify product features associated with that SKU (step C, 608). The models can be trained using one or more neural networks, such as convolution neural networks (CNNs). One or more other deep learning techniques and/or algorithms can be used to train the product identification model for the particular SKU. Using a neural network, for example, features associated with the particular SKU can be identified and mapped out. The model can then be trained to identify such features and assign confidence values indicating whether, in the aggregate, image data includes one or more features that the model is trained to identify. The more features, for example, that the model identifies, the higher a confidence value that the product in the image data is the product that is identified by the model.

As an example, SKU A can be associated with chocolate cake and SKU B can be associated with granola bars. A product identification model for SKU A can be trained using image training data 602 of chocolate cakes. Some images of granola bars associated with SKU B can also be used to train the product identification model for SKU A to not identify or associate features of granola bars with features of chocolate cake. By including some image training data of the product that is not intended to be identified by the product identification model, the model can more accurately identify a product during runtime. Thus, in step C, the computing system 102 can train the model for SKU A to identify features such as a size of the chocolate cake packaging, opacity or other wrapping of the chocolate cake, color of the cake, icing, sprinkles, or other designs on the cake, roundness of corners, etc. The computing system 102 can train a model for SKU B to identify features such as size of a single granola bar, size of a granola bar box, labels on a granola bar or box, colors on granola bar or box packaging, sharpness of corners on a granola bar or bow, etc. In training the models, the computing system 102 can train the model for SKU A to identify that sharp corners (a feature of the granola bars associated with SKU B) likely are not associated with a chocolate cake and that bright blue labeling across an entirety of the product (a feature of the granola bars associated with SKU B) is not associated with a chocolate cake.

Once a product identification model is trained by the computing system 102, the computing system 102 can generate the model for each SKU (step D, 610). The computing system 102 can then output each model per SKU (step E, 612). For example, outputting each model can include storing each model in a data store (e.g., refer to FIG. 9). Once the models are outputted, the models can be used by the computing system 102 to identify products that are scanned at checkout lanes across the network of stores.

Each of the models can be trained to provide output indicating a likelihood that an imaged product is the product identified by the product identification model. For example, as described in reference to the product classification model (e.g., refer to FIGS. 3-5), the output can be a confidence level that is a floating value. In another example, the output can be a binary value (e.g., True/False, Yes/No, 0/1) indicating whether or not the product is the product identified by the particular product identification model.

Figure 7:
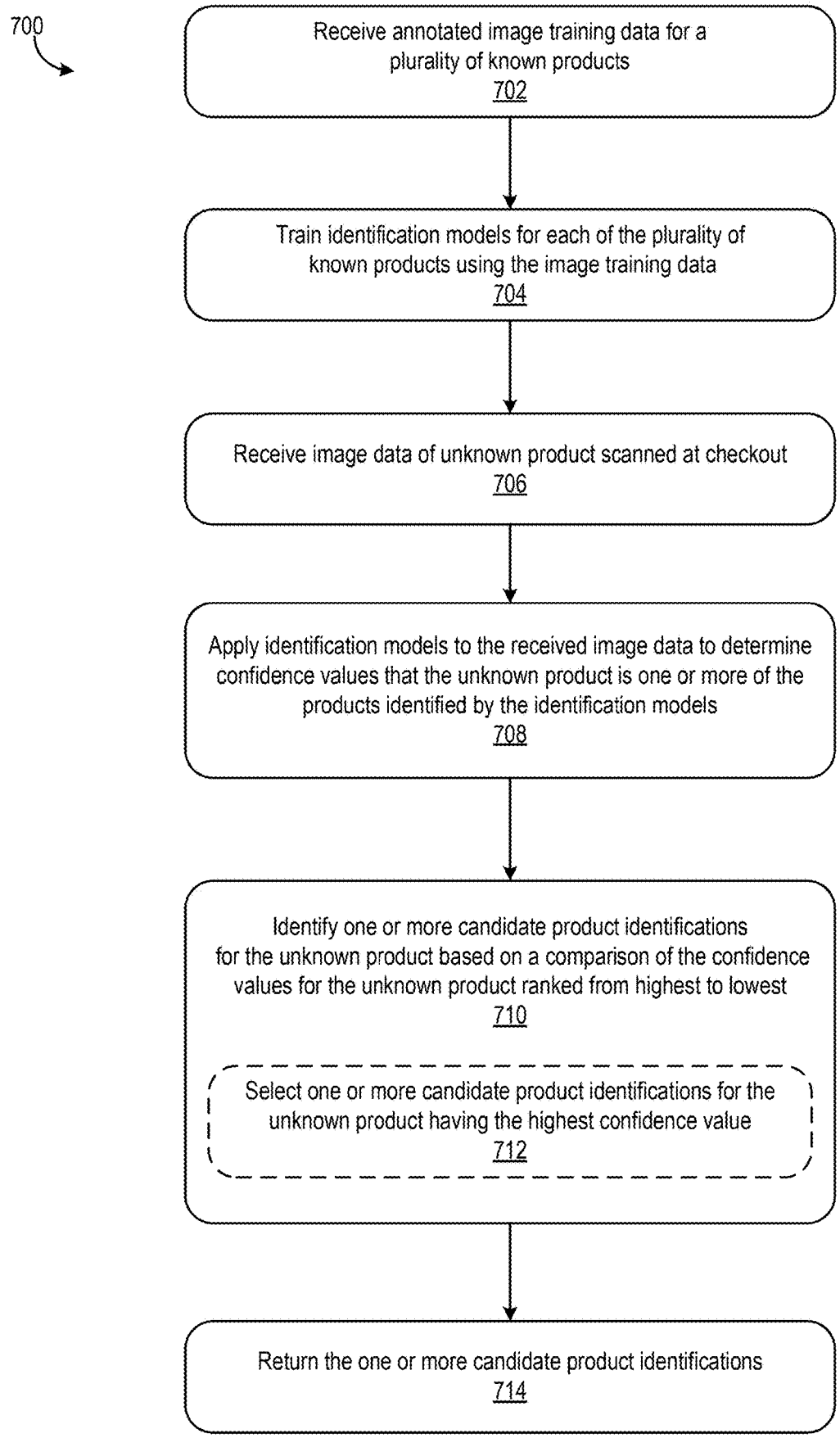
FIG. 7 is a flowchart of a process for identifying a product using one or more of the machine learning product identification models.

FIG. 7 is a flowchart of a process 700 for identifying a product using one or more of the machine learning product identification models. The process 700 can be performed by the computing system 102. Sometimes, the overhead camera 110 can be integrated with or otherwise part of the computing system 102. Thus, the process 700 can be performed by the overhead camera 110 and the computing system 102. One or more blocks in the process 700 can also be performed by one or more other computing systems, servers, devices, cloud services, and/or edge computing devices. For illustrative purposes, the process 700 is described from a perspective of a computing system.

Referring to the process 700, the computing system can receive annotated image training data for a plurality of known products in 702. Refer to step A (604) in FIG. 6. The computing system can then train identification models for each of the plurality of known products using the image training data in 704. Refer to steps B-E (606-612) in FIG. 6. As described herein, the computing system can generate an identification model for each known product. Each identification model can be trained to determine whether an imaged unknown product has features of the product associated with the identification model. Each identification model can output a confidence value indicating a likelihood that the imaged unknown product is the product associated with the model.

During runtime, the computing system can receive image data of an unknown product that is scanned at checkout (706). As described herein, an overhead camera can capture images of the unknown product upon detecting a scanning event at a checkout lane (e.g., refer to FIGS. 1, 2, and 10A-B).

The computing system can then apply one or more identification models to the received image data in 708. By applying the models, the computing system can determine confidence values that the unknown product is one or more of the products identified by the applied identification models. For example, the computing system can identify some features of the unknown product. The identified features can be used to select (e.g., retrieve from the data store) which of the identification models to apply to the received image data.

For example, image data can be received of a banana, an unknown product. Initial product feature identification of the banana can return features such as a yellow color, a stem, some green coloring, a narrow oblong shape, a curvature of the shape, and that no packaging surrounds the banana. The computing system can use these features to select one or more identification models that are associated with products having similar features. The computing system can select a model for identifying zucchini, which is also yellow, a narrow oblong shape, and without packaging. The computing system can select a model for identifying bananas. The computing system can also select a model for identifying squash, which can sometimes be yellow, sometimes have some green coloring, can have a stem, can have a narrow oblong shape, can sometimes have some curvature, and may also not have packaging. These three models can be applied to the image data of the banana, the unknown product, in order to determine whether the banana, the unknown product, in the image data matches any of the modeled known products.

The computing system can select one or more product identification models based on a scanned barcode. For example, if the unknown product's barcode or other product identifier is scanned by one or more of the scanning devices at the checkout lane, the computing system can use the scanned barcode to select an identification model associated with a product having the scanned barcode. By applying that model, the computing system can determine whether unknown product in the image data matches the product associated with the scanned barcode. The computing system can also select models for products that are similar to the product associated with the scanned barcode. Thus, the computing system can determine whether the unknown product in the image data matches any of the products that are similar to the product associated with the scanned barcode. Products can be identified as similar in one or more product catalogs. Products can also be identified as similar based on being part of a same category of products and/or having a same supplier. Different parameters can also be used to identify products that are similar.

The computing system can apply a threshold number of models to try and identify the unknown product. Each of the applied models can return confidence values, which can then be ranked from most likely product identification to least likely product identification. Sometimes, the computing system can continue to apply product identification models until one of the applied models returns a highest confidence value or a confidence value that exceeds some predetermined threshold value. Thus, the computing system can apply the models until the product can be positively identified. Other times, the computing system can apply a predetermined number of identification models, as described above.

The computing system can identify one or more candidate product identifications for the unknown product based on a comparison of the confidence values for the unknown product in 710. The confidence values can be ranked from highest to lowest value. The highest confidence value can indicate a most likely match. In the example above where the unknown product is a banana, the zucchini model can return the lowest confidence value (since the least amount of zucchini features can be identified in the image data of the banana) and the banana model can return the highest confidence value (since the most amount of banana features can be identified in the image data of the banana that is being scanned during checkout).

The computing system can optionally select one or more of the candidate product identifications for the unknown product having the highest confidence value (712). In the example above where the unknown product is the banana, the computing system can select a SKU associated with the banana model since the banana model returned the highest confidence value. The computing system can select a candidate product identification that has a confidence value that exceeds a threshold value. The computing system can also select a candidate product identification that has the highest confidence value. Sometimes, the computing system may only select a candidate product identification if it has the highest possible confidence value that can be assigned (e.g., 100 on a scale of 1 to 100, 1 on a scale of −1 to 1, etc.).

Finally, the computing system can return the one or more candidate product identifications in 714. Thus, the computing system can return a list of the candidate product identifications. The computing system can also return a most likely candidate product identifications. Refer to block 414 in FIG. 4 for further discussion.

Figure 8:
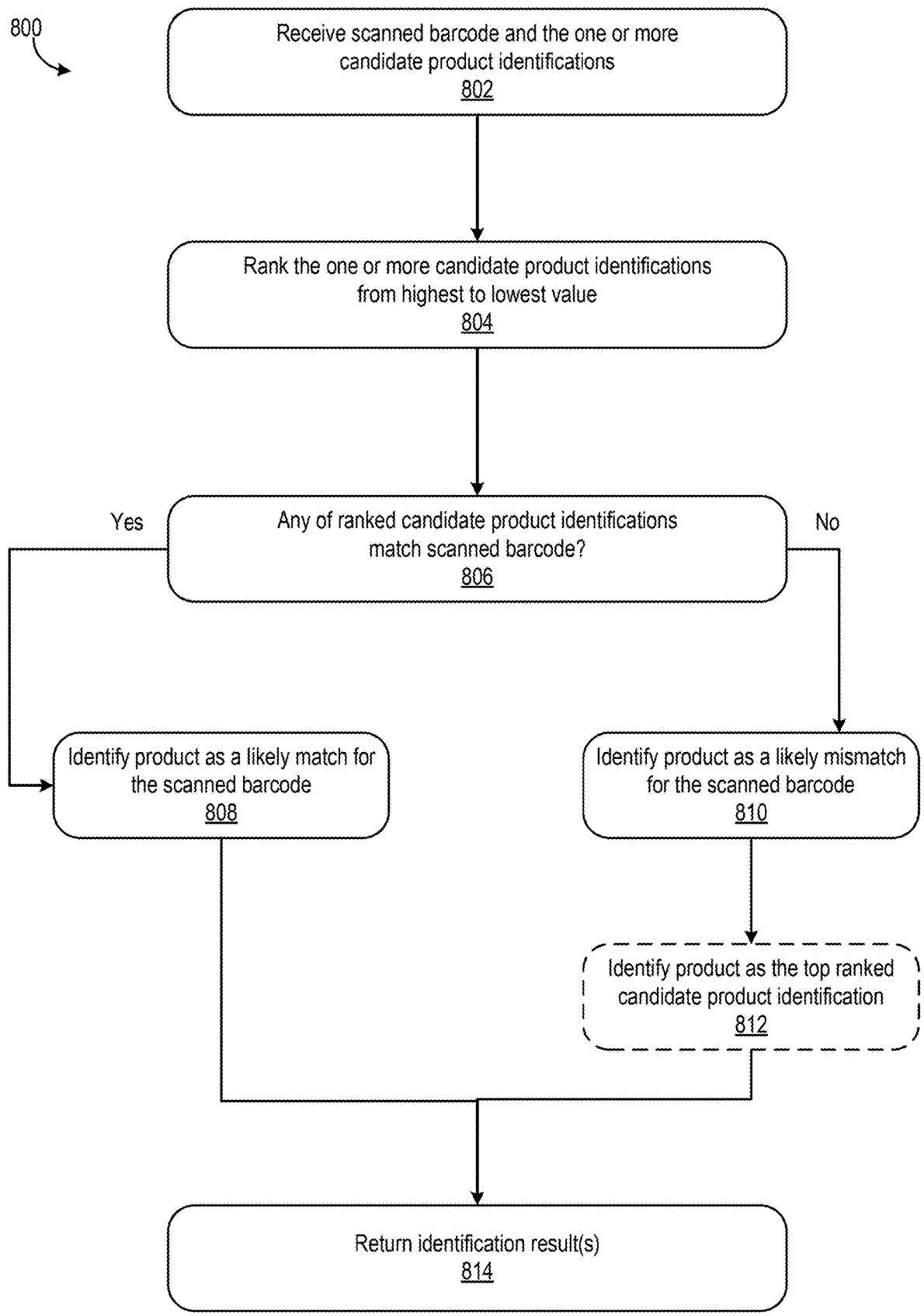
FIG. 8 is a flowchart of a process for determining whether an imaged product matches a scanned product label.

FIG. 8 is a flowchart of a process 800 for determining whether an imaged product matches a scanned product label. The process 800 can be used to determine whether a customer engaged in ticket switching and is trying to purchase a product with an incorrect barcode. The process 800 can be performed by the computing system 102. Sometimes, the overhead camera 110 can be integrated with or otherwise part of the computing system 102. Thus, the process 800 can be performed by the overhead camera 110 and the computing system 102. One or more blocks in the process 800 can also be performed by one or more other computing systems, servers, devices, cloud services, and/or edge computing devices. For illustrative purposes, the process 800 is described from a perspective of a computing system.

Referring to the process 800, the computing system can receive a scanned barcode and the one or more candidate product identifications in 802. The barcode can be scanned by a scanning device at a checkout lane, such as one or more of the scanning devices 116 at the checkout lane 100 (e.g., refer to FIG. 1). A customer, for example, can place the unknown product over/on a flatbed scanner, which can recognize and scan the barcode appearing on the unknown product. The barcode can be another type of label or product identifier, such as a sticker, QR code, and/or SKU. The one or more candidate product identifications can be determined by the computing system after applying the product classification model and/or multiple product identification models to image data of the unknown product associated with the scanned barcode (e.g., refer to FIGS. 4 and 7). Each of the received candidate product identifications can also include associated confidence values, as described throughout this disclosure.

The computing system can rank the one or more candidate product identifications from highest to lowest value in 804. As described above, the ranking/sorting can be based on confidence values that indicate a likelihood that the imaged product is one or more of the candidate product identifications.

Once ranked, the computing system can determine whether any of the ranked candidate product identifications match the scanned barcode in 806. The computing system can start from highest ranked candidate product identification and move down the list to the lowest ranked candidate product identification. After all, the highest ranked candidate product identification more likely identifies the product in the image data. If the highest ranked candidate product identification matches a product associated with the scanned barcode, then the computing system can determine that the customer has not swapped barcodes. In other words, the customer is purchasing the product that is associated with the scanned barcode and therefore is paying the actual price for the product. If none of the ranked candidate product identifications match the scanned barcode, then the computing system can determine that the customer likely swapped barcodes. In other words, the customer likely swapped barcodes so that they do not have to pay the actual price associated with the product they are purchasing.

For example, if a low ranked candidate product identification matches the scanned barcode, this can raise some suspicion as to whether or not the customer engaged in ticket switching. However, the ticket switching in such a scenario may be minimal and therefore may not warrant some action to be taken to stop the customer. For example, a banana can have a candidate product identification of zucchini, as mentioned above. If the customer is actually purchasing a banana but the customer put a barcode sticker on the banana that belongs to a zucchini, the computing system may identify that the low ranked candidate product identification of zucchini matches the scanned barcode. This match can indicate that the customer might have swapped the barcode on the banana with that of the zucchini. However, a price difference between the banana and the zucchini can be so minimal or low that this barcode swapping may not be egregious or warrant any type of action to be taken against the customer.

Still referring to the process 800 in FIG. 8, if any of the ranked candidate product identifications match the scanned barcode in 806, the computing system can identify the product as a likely match for the scanned barcode in 808. Thus, the computing system can determine that the customer likely is not engaging in ticket switching.

On the other hand, if none of the ranked candidate product identifications match the scanned barcode in 806, then the computing system can identify the product as a likely mismatch for the scanned barcode 810. Thus, the computing system can determine that the customer is likely engaging in ticket switching.

The computing system can optionally identify the product as the top ranked candidate product identification in 812. Positively identifying the product in 812 can be advantageous to determine what product the customer is actually purchasing. The positive identification can also be beneficial to update the customer's transaction to reflect a price of the product that is actually being purchased rather than a price associated with the barcode that the customer scanned during the checkout process. Additionally, positive identification of the product can be beneficial to determine how serious the customer's ticket switching is since a price of the actual product can be compared to a price associated with the scanned barcode.

For example, if the product that is actually being purchased is identified in 812 as a cellphone but the scanned barcode is associated with a DVD, the computing system and/or an in-store employee (e.g., AP) at a computing device that receives the candidate product identifications can determine that the price difference between the cellphone and the DVD exceeds a predetermined threshold level. Consequently, the computing system and/or the in-store employee can conclude that the customer is engaging in a more egregious ticket switching incident that warrants some action to be taken, such as stopping the customer from leaving the store with the cellphone for which they did not pay the actual price.

Finally, the computing system can return the identification result(s) in 814. For example, the computing system can return a determination that the product likely matches the scanned barcode (block 808). The computing system can return a determination that the product likely does not match the scanned barcode (block 810). The computing system can also return a determination that the product is a top ranked candidate product identification (block 812). The computing system can even return a list of top ranked candidate product identifications.

As described herein, the identification result(s) of 814 can be stored in a data store. The identification result(s) can also be transmitted to one or more devices, computing systems, and/or servers, including but not limited to a POS terminal or a computing device of in-store employees (e.g., refer to block 414 in FIG. 4).

Figure 9:
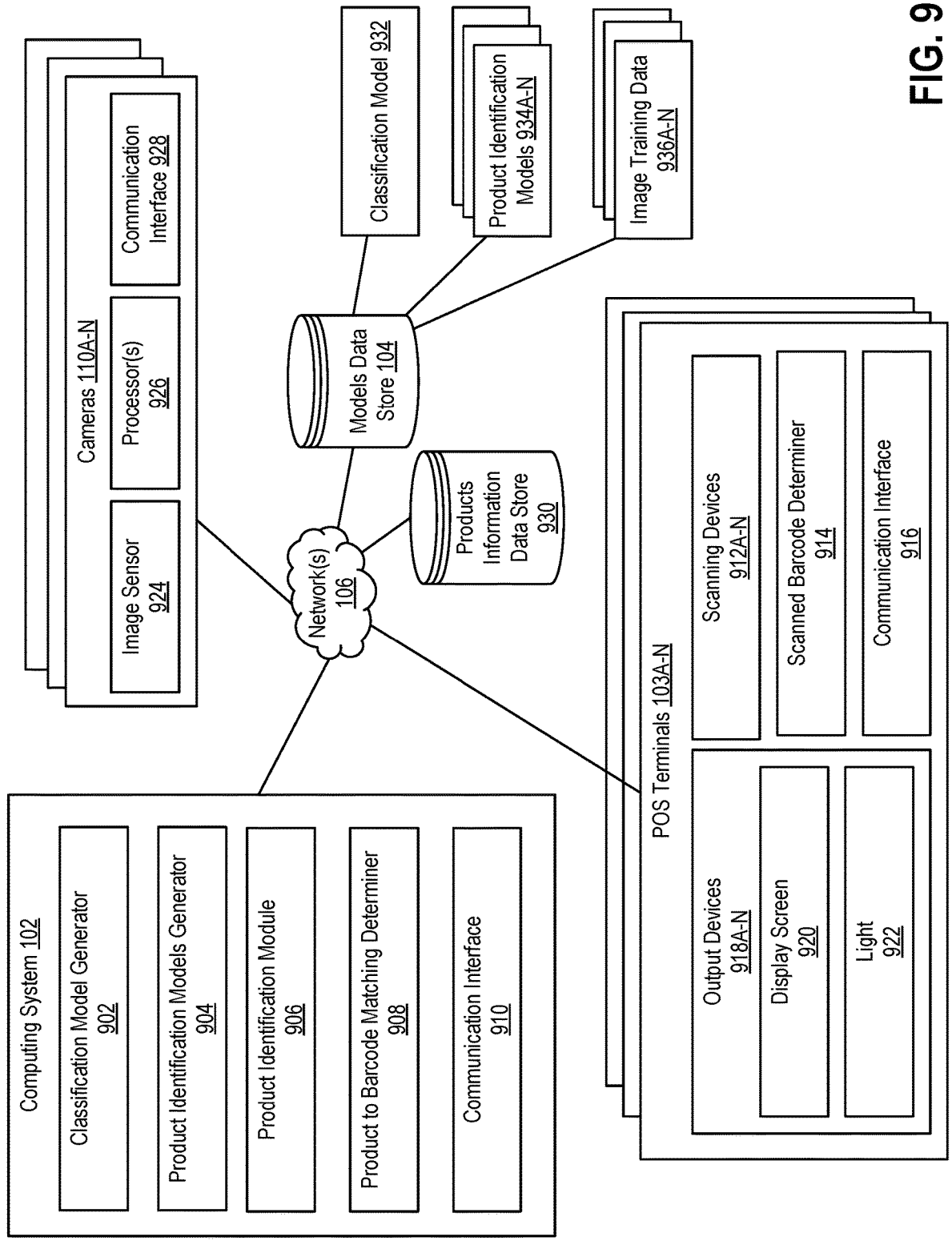
FIG. 9 is a system diagram of one or more components used to perform the techniques described herein.

FIG. 9 is a system diagram of one or more components used to perform the techniques described herein. As described herein, the computing system 102, POS terminals 103A-N, cameras 110A-N, and models data store 104 can be in communication (e.g., wired and/or wireless) over the network(s) 106. A product information data store 930 can also communicate with one or more of the components described herein via the network(s) 106.

The POS terminals 103A-N can each include scanning devices 912A-N, a scanned barcode determiner 914, a communication interface 916, and output devices 918A-N. The POS terminals 103A-N can be positioned at each checkout lane in a retail environment, such as a store. The POS terminals 103A-N can present information to a customer as they are checking out. For example, the POS terminals 103A-N can output information such as products that have been scanned by the customer, prices of the scanned products, options to search for products that may or may not have identifying labels, etc. The POS terminals 103A-N can also be configured to present a final bill or transaction to the customer and receive a form of payment from the customer to complete the checkout process.

The scanning devices 912A-N can include devices configured to scan or otherwise identify barcodes, QR codes, labels, RFID tags, and/or SKUs (e.g., refer to the scanning devices 116 in FIG. 1). For example, the scanning devices 912A-N can include a handheld scanner that the customer can point or direct towards a label on a product to be purchased. The scanning devices 912A-N can also include a flatbed scanner. The customer can move a product over the flatbed scanner, which can be configured to identify a label on the product. The scanning devices 912A-N may also include heat sensors, a scale, or other weight sensors that can be used to identify a product to be purchased. Moreover, the scanning devices 912A-N can include cameras, such as a flatbed camera and/or a camera located on a handheld scanner.

The scanned barcode determiner 914 can be configured to identify a product based on a barcode or other label that is scanned by the scanning devices 912A-N during a checkout process. For example, the scanned barcode determiner 914 can receive the scanned barcode from the scanning devices 912A-N. The scanned barcode determiner 914 can retrieve product information from the products information data store 930 using the scanned barcode as an identifier. For example, the scanned barcode determiner 914 can match the scanned barcode with a SKU of a product in the products information data store 930. Once the scanned barcode is matched with a product, the scanned barcode determiner 914 can identify a price for that product. The price can be outputted to the customer at a display of the POS terminal 103A-N and/or another display screen at the checkout lane (e.g., the display screen 113 in FIG. 1). Product information associated with the scanned barcode, which can be stored in the products information data store 930, can also be transmitted to the computing system 102 and used by the computing system 102 to determine whether the scanned barcode matches a product that the customer is actually purchasing.

The output devices 918A-N can provide some form of output that indicates a scanning event took place at the POS terminal 103A-N. For example, the output devices 918A-N an include a display screen 920 and a light 922. The output devices 918A-N can include one or more other devices. The display screen 920 can be configured to output information about the customer's transaction, such as products that have been scanned, prices for the scanned products, and a total cost for the customer's transaction. The display screen 920 can also receive input from the customer indicating what products the user is purchasing. For example, the display screen 920 can provide a search feature where the customer can input parameters to search for a particular product (e.g., fresh produce, products that do not have barcodes, products that are weighed, etc.). The light 922 can be configured to automatically illuminate a scanning area in the checkout lane when the customer scans products. In other words, when the scanning devices 912A-N are activated, the light 922 can illuminate the scanning area to provide uniform lighting over the product that is being scanned. As a result, a barcode or other product identifier can be more accurately captured by the scanning devices 912A-N. The light 922 can be any type of light signal including but not limited to an infrared light, LiDAR, red light, an LED, etc. The light 922 can also be detected by the cameras 110A-N in order to determine whether a scanning event has occurred at the checkout lane.

The cameras 110A-N can be low resolution overhead cameras that are installed in the retail environment, such as a store. For example, the cameras 110A-N can be installed in a ceiling of the store surrounding or in the checkout area. The cameras 110A-N can be part of a security system. The cameras 110A-N can include an image sensor 924, processor(s) 926, and a communication interface 928. As described throughout this disclosure, sometimes, the cameras 110A-N can be part of a same system as the computing system 102. The cameras 110A-N can also be separate from the computing system 102.

The image sensor 924 can be configured to capture image data from a FOV of each of the cameras 110A-N. The image sensor 924 can capture a stream of images and/or videos. The image sensor 924 can continuously capture the image data. Sometimes, the image sensor 924 can capture the image data upon detecting a scanning event in a checkout lane. The image sensor 924 can be trained on one or more checkout lanes in the checkout area. The captured image data can therefore include the one or more checkout lanes, as described herein (e.g., refer to FIGS. 1-2).

The processor(s) 926 can be configured to detect when a scanning event occurs in the checkout lane. Based on detecting the scanning event, the processor(s) 926 can instruct the image sensor 924 to capture the image data. The processor(s) 926 can also select a portion of the image data that was captured at a same time that the scanning event was detected. The processor(s) 926 can detect the scanning event based on identifying a light signal or other optical signal that originates from the output devices 918A-N of the POS terminals 103A-N. For example, the camera 110A-N can detect light that is outputted by the light 922 when a product is scanned by the scanning devices 912A-N. By detecting this light, the processor(s) 926 of the cameras 110A-N can determine that a scanning event occurred and that image data of the product being scanned should be captured. Sometimes, the processor(s) 926 can also determine or otherwise identify which checkout lane the scanning event originated from (e.g. refer to FIG. 2). The processor(s) 926 can also detect the scanning event based on receiving an event-based timestamp from the POS terminals 103A-N. The event-based timestamp can indicate a time at which a scanning event occurs. The processor(s) 926 can then be configured to identify a portion of the image data captured by the image sensor 924 that has the same timestamp. Finally, the processor(s) 926 can be transmit the captured image data to the computing system 102 for further processing and analysis.

The computing system 102 can include a classification model generator 902, a product identification models generator 904, a product identification module 906, a product to barcode matching determiner 908, and a communication interface 910. Such components can be configured to perform the techniques described throughout this disclosure.

The classification model generator 902 can be configured to generate and train the product classification model as described in reference to FIGS. 3-5. The product classification model can be trained using image training data 936A-N. The image training data 936A-N can be retrieved, by the classification model generator 902, from the models data store 104. The classification model generator 902 can also receive the image training data 936A-N directly from one or more of the cameras 110A-N. The generated product classification model can be stored as classification model 932 in the models data store 104. The classification model 932 can then be retrieved by and used by the computing system 102 during runtime to identify products that are being scanned during checkout processes. The same classification model 932 can be used to identify products scanned across a network of stores. Sometimes, product classification models can be generated per store, such that each store can use a different product classification model.

The product identification models generator 904 can be configured to generate and train product identification models as described in reference to FIGS. 6-7. The models can also be trained using image training data 936A-N. The generated identification models can be stored as product identification models 9934A-N in the models data store 104. The models 934A-N can then be retrieved and used by the computing system 102 during runtime to identify products that are scanned during checkout processes.

The product identification module 906 can be configured to identify products that are being scanned by the customer at the checkout lane using the techniques described herein (e.g., refer to FIGS. 4 and 7). The product identification module 906 can receive image data of an unknown scanned product from the cameras 110A-N. The product identification module 906 can apply one or more of the classification model 932 and/or the product identification models 934A-N to the image data to identify the unknown scanned product. Identifying the product can include generating a list of candidate product identifications. Each of the candidate product identifications can have a confidence value indicating how likely the unknown product is the candidate product identification.

The product to barcode matching determiner 908 can be configured to determine whether the identified product matches the scanned barcode using the techniques described herein (e.g., refer to FIG. 8). For example, the product to barcode matching determiner 908 can receive the list of candidate product identifications from the product identification module 906 as well as product information associated with the scanned barcode from the POS terminals 103A-N. The product to barcode matching determiner 908 can compare the confidence values of the candidate product identifications to the product information associated with the scanned barcode. If any of the candidate product identifications match product information associated with the scanned barcode, then the product to barcode matching determiner 908 can determine that the customer most likely did not engage in ticket switching.

If there are no matches between the list of candidate product identifications and the scanned barcode, then the product to barcode matching determiner 908 can determine that there is a mismatch and that the customer most likely engaged in ticket switching. The product to barcode matching determiner 908 can sometimes positively identify the product, especially when there is a mismatch between the identified product and the scanned barcode.

Matching results generated by the product to barcode matching determiner 908 can be transmitted to the POS terminals 103A-N. The POS terminals 103A-N can output an actual price for the identified product when the product to barcode matching determiner 908 identifies a mismatch between the product and the scanned barcode. The POS terminals 103A-N can also allow for completion of a checkout process based on whether there is a match or mismatch. When there is a mismatch, for example, the POS terminals 103A-N can allow the checkout process to complete where a difference in price between the scanned barcode and the identified product is minimal or below a predetermined threshold value. In other examples, when there is a mismatch, the POS terminals 103A-N can prohibit the checkout process from completing when the difference in price exceeds the predetermined threshold value (e.g., the customer scanned a barcode for a book that is on sale but the actual product being purchased is a full-price smartphone).

Sometimes, the POS terminals 103A-N can output recommendations to the customer about what products the customer is purchasing. For example, when there is a mismatch, the POS terminal 103A-N can output one or more of the candidate product identifications. The customer can then select the candidate product identification that matches the actual product that the customer is purchasing. This can be advantageous to dissuade or otherwise prevent the customer from ticket switching. The customer-selected candidate product identification can then be added to the customer's transaction. Moreover, the customer's selection can be used to further train and/or improve one or more of the classification model 932, the product identification models 934A-N, and/or the product to barcode matching determiner 908.

As described throughout this disclosure, matching results generated by the product to barcode matching determiner 908 can also be transmitted to a computing device of an in-store employee, such as AP. The in-store employee can use the matching results to make decisions about monitoring and/or apprehending the customer. The in-store employee can also use the matching results to make determinations about shortages of products, which can be attributed to theft, ticket switching, or other security-related incidents.

Finally, the communication interfaces 910, 916, and 928 can be configured to provide for communication between one or more of the components and/or systems or devices described herein, via the network(s) 106.

FIGS. 10A-B is a flowchart of a process 1000 for determining whether an imaged product matches a scanned product label. The process 1000 can be performed by the computing system 102. Sometimes, the overhead camera 110 can be integrated with or otherwise part of the computing system 102. Thus, the process 1000 can be performed by the overhead camera 110 and the computing system 102. One or more blocks in the process 1000 can also be performed by one or more other computing systems, servers, devices, cloud services, and/or edge computing devices. For illustrative purposes, the process 1000 is described from a perspective of a computing system.

Referring to process 1000 in both FIGS. 10A-B, the computing system can identify a scanning event for an unknown product at a checkout lane (1002). The computing system can identify the scanning event based on detecting a flash of a scan at the checkout lane (1004). As described throughout this disclosure, the flash can be a light that is outputted by a light at a POS terminal at the checkout lane. The flash can also be any other type of light signal that may be outputted at the checkout lane to illuminate a product label to be scanned. The flash can also be a light signal that is outputted to indicate that the product label was successfully scanned.

The computing system can also detect an optical signal from any device or other component at the checkout lane (1006). As mentioned above in reference to the flash, the optical signal can be outputted to illuminate a scanning area at the checkout lane and, more particularly, a product label to be scanned. The optical signal can also be outputted after a product scan was made to notify a customer of the successful scan. The optical signal can be outputted by a variety of devices, including but not limited to the POS terminal, a handheld scanner, a scanning device, and/or a flatbed scanner.

As an illustrative example, a customer can use a handheld scanner to scan a barcode of a water bottle at the checkout lane. When the customer directs the handheld scanner at the barcode on the bottle, a red light is emitted by the handheld scanner to illuminate the barcode during this scanning event. The computing system can include one or more sensors that detect the red light emitted by the handheld scanner. Because the computing system detected the red light, the computing system can identify that a scanning event is occurring at the checkout lane.

As another illustrative example, the customer can move a book having a product label across a flatbed scanner at the checkout lane. Upon successful detection and scanning of the product label by the flatbed scanner, a display screen of a POS terminal at the checkout lane can change displays, light up, or otherwise update the customer's bill. The activity on the display screen can be detected by the one or more sensors of the computing system. Because the computing system detected such optical signal(s), the computing system can identify that a scanning event has occurred at the checkout lane.

The computing system can also receive event-based timestamps from a POS terminal at the checkout lane (1008). The computing system can transmit a request to the POS terminal at predetermined times, wherein the request prompts the POS terminal for any scans (e.g., the customer scans products at the checkout lane), transactions (e.g., the customer completes the transaction and pays), or other activity (e.g., the customer searches for a product at a display screen of the POS terminal or manually inputs information about a product that does not have a barcode) that occurred during a predetermined period of time. The POS terminal can transmit a response to the computing system that includes timestamps for each scan, transaction, or other activity that occurred during the predetermined period of time. Using these event-based timestamps, the computing system can identify that a scanning event occurred. Accordingly, the computing system can use the event-based timestamps to identify image data that captures the scan, transaction, or other activity that occurred.

Sometimes, the POS terminal can automatically transmit event-based timestamps to the computing system without requiring the computing system to transmit requests. For example, every time that a product is scanned at the checkout lane, the POS terminal can transmit information to the computing system such as a timestamp when the barcode or product label is scanned, the scanned barcode, a price associated with the scanned barcode, and other product information associated with the scanned barcode (e.g., product name). As another example, the POS terminal can automatically transmit such information to the computing system at predetermined time intervals. As a result, the POS terminal can transmit timestamps associated with multiple scanning events, where each timestamps indicates a different product that has been scanned. As yet another example, the POS terminal can automatically transmit such information to the computing system once the customer is done scanning products and the customer selects an option presented at the POS terminal to complete the transaction.

Once the computing system identifies the scanning event, the computing system can capture image data of a relevant portion of the checkout lane that had the scanning event in 1010. When one overhead camera is trained on one checkout lane, that overhead camera can capture image data of that checkout lane when the scanning event is detected there. As described in reference to FIG. 1, the overhead camera can capture a scanning area of the checkout lane as well as some area surrounding the checkout lane. The overhead camera can be low resolution and fixed with one FOV. However, sometimes, the overhead camera can be controlled by the computing system to zoom in, pan, and/or tilt towards the relevant portion of the checkout lane that includes the scanning area and/or the product that was scanned.

As described in reference to FIG. 2, an overhead camera can also be trained on multiple checkout lanes. In such scenarios, the overhead camera can capture image data of the multiple checkout lanes as well as some surrounding area in 1010. Sometimes, the overhead camera can be controlled by the computing system to pan, tilt, and/or zoom towards the particular checkout lane where the scanning event was detected.

In 1012, the computing system can retrieve the classification model and/or one or more product identification models described throughout this disclosure. The computing system can retrieve the model or models at any point before block 1014. For example, the computing system can load the model or models into memory before runtime (e.g., before the process 1000) or before, during, or after any one of blocks 1002-1010. Sometimes, the computing system may not retrieve the model or models until the computing system captures the image data in 1010. Sometimes, the computing system can use the same model or models for all scanning events detected in a particular store and/or network of stores.

The computing system can then identify the unknown product from the image data based on applying the retrieved model or models to the image data in 1014. For example, the computing system can select a portion of the image data that depicts the unknown product in 1016. Using object recognition techniques and/or one or more machine learning models, the computing system can identify a product in the image data and extract the product from a surrounding environment in the image data.

As an illustrative example, the captured image data can include a checkout lane, a flatbed scanner, a customer, and a banana on the flatbed scanner. The computing system can apply a machine learning model that is trained to identify a product, the banana, thereby differentiating the banana from body parts of the customer (e.g., the customer's hand, arm, torso, etc.). Using the machine learning model, the computing system can then extract the portion of the image data having the banana, thereby differentiating the banana from the flatbed scanner and other portions of the checkout lane that may be visible in the image data. This extracted portion of the image data can then be used by the computing system to identify the product, the banana, and determine whether the product matches the barcode that was scanned during the detected scanning event.

The computing system can then identify candidate product identifications based on applying the classification model to the selected portion of the image data (1018). Refer to FIGS. 4-5 for further discussion on application of the classification model. The computing system can also identify candidate product identifications based on applying the product identification models to the selected portion of the image data (1020). Refer to FIG. 7 for further discussion on application of the product identification models.

Accordingly, the computing system can determine whether the identified product matches a barcode that was scanned during the scanning event at the checkout lane in 1022. Refer to FIG. 8 for further discussion on determining whether there is a match or mismatch of identified product to barcode.

The computing system can output identification results in 1024. For example, the computing system can output an indication of a product match (1026). The computing system can output an indication of a product mismatch (1028). The computing system can also output an indication of a most likely candidate product identification and/or a list of top candidate product identifications (1030). The computing system can also output a recommendation of actions that can be taken in response to identification of a product mismatch (1032). Refer to block 414 in FIG. 4 for further discussion on outputting the identification results.

The process 1000 can be performed for each scanning event that is detected at a checkout lane in a store. Moreover, the process 1000 can be performed simultaneously for scanning events that are detected at multiple checkout lanes in the store and/or across a network of stores.

Figure 11:
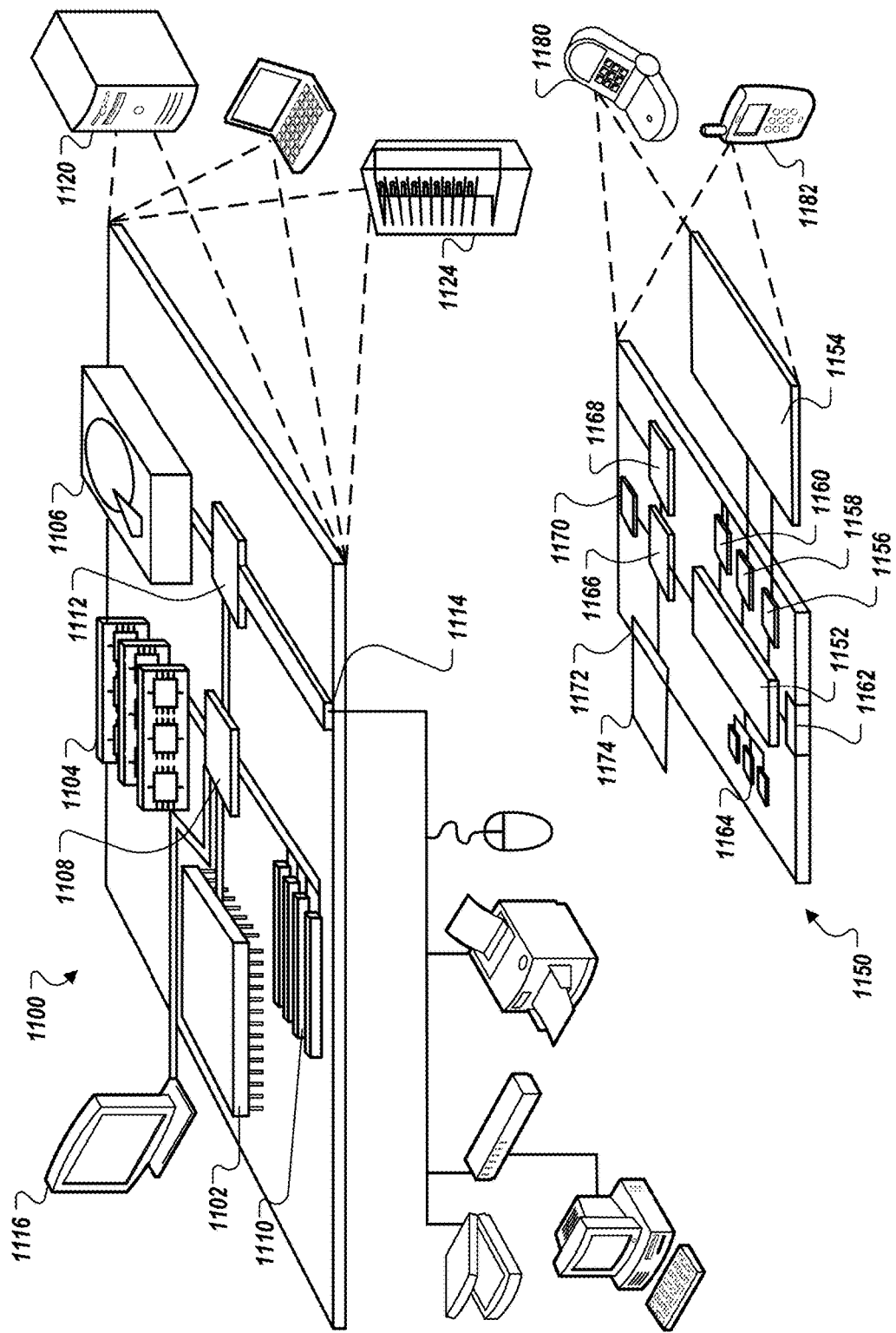
FIG. 11 is a schematic diagram that shows an example of a computing device and a mobile computing device that can be used to perform the techniques described herein.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180. It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for determining whether an unknown product matches a scanned barcode during a checkout process, the system comprising:
   a checkout lane including:
      a flatbed scanning area configured to receive one or more products to be purchased by a user, the flatbed scanning area including one or more scanning devices;
      a point of sale (POS) terminal configured to:
         scan, using one or more of the scanning devices, a product identifier of an unknown product as the unknown product is moved over the flatbed scanning area;
         identify, based on the scanned product identifier, a product associated with the scanned product identifier; and
         transmit, to a computing system, information about the product associated with the scanned product identifier;
      an overhead camera having a field of view that includes the flatbed scanning area of the checkout lane, wherein the overhead camera is configured to:
         detect an optical signal from the POS terminal, wherein the optical signal comprises a flashing light;
         identify, based on detecting the optical signal from the POS terminal, that a scanning event has occurred at the checkout lane;
         instruct, based on identifying that the scanning event has occurred at the checkout lane, an imaging sensor of the overhead camera to capture image data of the unknown product as it is moved over the flatbed scanning area;
         capture, by the imaging sensor and based on the instructing, the image data of the unknown product as it is moved over the flatbed scanning area; and
         transmit, to the computing system, the captured image data of the unknown product; and
      the computing system configured to (i) generate one or more machine learning product identification models for identifying unknown products from image training data and (ii) determine, during runtime, whether the unknown product matches the product associated with the scanned product identifier, the computing system configured to, after the scanning of the product identifier by the POS terminal:
         retrieve, from a data store, one or more of the product identification models;
         identify a plurality of candidate product identifications for the unknown product based on applying the one or more product identification models to the image data, wherein the one or more product identification models are trained to output a plurality of confidence values for the plurality of candidate product identifications, wherein each confidence value of the plurality of confidence values indicates a likelihood that the unknown product matches a respective candidate product identification of the plurality of candidate product identifications;

rank the plurality of candidate product identifications based on the plurality of confidence values;

determine whether any of the ranked plurality of candidate product identifications match the information about the product associated with the scanned product identifier to generate matching results; and automatically transmit the matching results to the POS terminal based on a determination that none of the ranked plurality of candidate product identifications match the information about the product associated with the scanned product identifier, wherein, in response to receiving the matching results, the POS terminal blocks completion of a transaction during the checkout process at the checkout lane when a difference in price between the product associated with the scanned product identifier and an identified product associated with at least one of the one or more ranked plurality of candidate product identifications exceeds a threshold value.

2. The system of claim 1, wherein the computing device is configured to transmit a notification to a user device of an in-store employee that the checkout process likely involves ticket switching based on determining that the unknown product does not match the product associated with the scanned product identifier.

3. The system of claim 1, wherein the overhead camera has a field of view that includes flatbed scanning areas of multiple checkout lanes.

4. The system of claim 1, wherein the optical signal comprises at least one of the flash of light, an infrared signal, a red light, and a change in display on a display screen of the POS terminal.

5. The system of claim 1, wherein the image training data includes images of a plurality of known products taken from a plurality of overhead cameras at a plurality of checkout lanes, wherein the plurality of overhead cameras have at least one of a same (i) vantage point of the known products, (ii) field of view, and (iii) lighting.

6. The system of claim 1, wherein the POS terminal is configured to identify the product associated with the scanned product identifier at a first time and the computing system is configured to identify the plurality of candidate product identifications at a second time.

7. The system of claim 1, wherein the product identification models include a product classification model, and wherein the computing system is configured to:
receive image training data of a plurality of known products;
train, using the image training data, the product classification model to identify features of each of the plurality of known products;
map, based on the identified features, the image training data into n-dimensional space, wherein each dimension in the n-dimensional space represents one of the identified features;
identify clusters in the n-dimensional space, wherein each of the clusters represent one or more known products having one or more of the identified features;
determine, based on the identified clusters, n-dimensional space values for each of the known products; and
output the product classification model and the n-dimensional space values for each of the known products.

8. The system of claim 7, wherein determining the n-dimensional space values for each of the known products includes:
identifying, for each of the clusters, a centroid;
determining, for each of the clusters, distances between each nearest neighbor and the centroid; and
determining an aggregate n-dimensional space value for the known product based on averaging the distances between each nearest neighbor and the centroid for each of the clusters.

9. The system of claim 1, wherein the product identification models include a plurality of product-based identification models, and wherein the computing system is configured to:
receive image training data of a plurality of known products;
select a first subset of the image training data that identifies a particular known product and a second subset of the image training data that identifies other known products that do not include the particular known product;
train an identification model for the particular known product to identify the particular known product; and
output the identification model for the particular known product.

10. The system of claim 9, wherein the computing system is configured to generate a product-based identification model for each of the known products identified in the image training data.

11. The system of claim 1, wherein the plurality of candidate product identifications is ranked from highest to lowest confidence value; and
wherein the computing system is further configured to:
identify that the unknown product does not match the product associated with the scanned product identifier based on determining that none of the ranked candidate product identifications match the information about the product associated with the scanned product identifier.

12. The system of claim 1, wherein the image data is captured, by the imaging sensor, within a threshold amount of time that the scanning event occurred.

13. A computing system for determining whether an unknown product matches a scanned barcode in n-dimensional space, the computing system configured to:
generate, before runtime, a product classification model for identifying unknown products from image data based on:
receiving, from overhead cameras positioned at a plurality of checkout lanes in a plurality of stores, image training data for a plurality of known products;
training, using the image training data, the product classification model to map visual features of the known products into multi-dimensional feature space; and
determining feature space values for each of the plurality of known products based on applying the product classification model to the image training data; and
determine, during runtime, whether an unknown product matches a product associated with a scanned product identifier based on:
receiving, from a POS terminal at a checkout lane in a store, information for the product associated with the scanned product identifier when the unknown product is scanned by a user during a checkout process;

receiving, from an overhead camera at the checkout lane, image data of the unknown product, wherein the image data is received in response to the overhead camera (i) detecting an optical signal from the POS terminal, (ii) identifying, based on the detecting, that a scanning event has occurred, (iii) instructing, based on identifying that the scanning event has occurred, an imaging sensor of the overhead camera to capture the image data of the unknown product as it is moved over the flatbed scanning area, and (iv) capturing, by the imaging sensor and based on the instructing, the image data;

generating a multi-dimensional space value for the unknown product based on applying the product classification model to the image data;

identifying one or more candidate product identifications for the unknown product based on comparing the multi-dimensional space value for the unknown product with the feature space values for each of the plurality of known products;

determining a plurality of confidence values for the one or more candidate product identifications, wherein each confidence value of the one or more confidence values indicates a likelihood that the unknown product matches a respective candidate product identification of the one or more candidate product identifications;

ranking the one or more candidate product identifications based on the plurality of confidence values;

determining whether any of the ranked one or more candidate product identifications match the product associated with the scanned product identifier to generate matching results; and automatically transmitting the matching results to the POS terminal based on a determination that none of the ranked one or more candidate product identifications match the product associated with the scanned product identifier, wherein, in response to receiving the matching results, the POS terminal blocks completion of a transaction during the checkout process at the checkout lane when a difference in price between the product associated with the scanned product identifier and an identified product associated with at least one of the ranked one or more candidate product identifications exceeds a threshold value.

14. The computing system of claim 13, wherein the one or more candidate product identifications are ranked from highest to lowest multi-dimensional space value; and
wherein the computing system is further configured to:
output the one or more candidate product identifications that are ranked within a threshold range.

15. The computing system of claim 14, wherein the computing system is configured to identify that the unknown product does not match the product associated with the scanned product based on determining that none of the outputted ranked candidate product identifications match the product associated with the scanned product identifier.

16. The computing system of claim 14, wherein the computing system is further configured to identify the unknown product as a top ranked candidate product identification amongst the outputted ranked candidate product identifications.

17. A computing system for determining whether an unknown product matches a scanned barcode using product-based identification models, the computing system configured to generate, before runtime, product-based identification models for each known product based on:
receiving annotated image training data for a plurality of known products; and
training, using the image training data, product-based identification models for each of the plurality of known products; and determine, during runtime, whether an unknown product matches a product associated with a scanned product identifier based on:
receiving, from a POS terminal at a checkout lane in a store, information for the product associated with the scanned product identifier when the unknown product is scanned by a user during a checkout process;
receiving, from an overhead camera at the checkout lane, image data of the unknown product, wherein the image data is received in response to the overhead camera (i) detecting an optical signal from the POS terminal, (ii) identifying, based on the detecting, that a scanning event has occurred, (iii) instructing, based on identifying that the scanning event has occurred, an imaging sensor of the overhead camera to capture the image data of the unknown product as it is moved over the flatbed scanning area, and (iv) capturing, by the imaging sensor and based on the instructing, the image data;
determining, based on applying the one or more product-based identification models to the image data, confidence values that the unknown product is one or more of the plurality of known products identified by the one or more product-based identification models;
identifying one or more candidate product identifications for the unknown product based on a comparison of each of the confidence values for the unknown product, wherein each confidence value of the confidence values indicates a likelihood that the unknown product matches a respective candidate product identification of the one or more candidate product identifications;
ranking the one or more candidate product identifications based on the confidence values;
determining whether any of the ranked one or more candidate product identifications match the product associated with the scanned product identifier to generate matching results; and
automatically transmitting the matching results to the POS terminal based on a determination that none of the ranked one or more candidate product identifications match the product associated with the scanned product identifier, wherein, in response to receiving the matching results, the POS terminal-blocks completion of a transaction during the checkout process at the checkout lane when a difference in price between the product associated with the scanned product identifier and an identified product associated with at least one of the ranked one or more candidate product identifications exceeds a threshold value.

18. The computing system of claim 17, further comprising transmitting a notification to a user device of an in-store employee that the checkout process likely involves ticket switching based on determining that the unknown product does not match the product associated with the scanned product identifier.

\* \* \* \* \*